(12) United States Patent
Beadles

(10) Patent No.: US 9,286,295 B2
(45) Date of Patent: Mar. 15, 2016

(54) APPARATUS AND METHOD FOR CLOUD BASED STORAGE USING A MULTI-LAYER SCANNABLE TAG

(71) Applicant: Robert Beadles, Lodi, CA (US)

(72) Inventor: Robert Beadles, Lodi, CA (US)

( * ) Notice: Subject to any disclaimer, the term of this patent is extended or adjusted under 35 U.S.C. 154(b) by 0 days.

(21) Appl. No.: 14/106,656

(22) Filed: Dec. 13, 2013

(65) Prior Publication Data

US 2014/0108606 A1 Apr. 17, 2014
US 2015/0012611 A9 Jan. 8, 2015

Related U.S. Application Data

(63) Continuation-in-part of application No. 14/081,766, filed on Nov. 15, 2013, which is a continuation-in-part of application No. 13/925,724, filed on Jun. 25, 2013, now abandoned, which is a continuation-in-part of (Continued)

(51) Int. Cl.
*G06F 17/20* (2006.01)
*G06F 17/30* (2006.01)

(Continued)

(52) U.S. Cl.
CPC .... *G06F 17/30017* (2013.01); *G06F 17/30876* (2013.01); *H04L 67/02* (2013.01); *H04W 12/06* (2013.01)

(58) Field of Classification Search
CPC ............................ G06F 17/30; G06F 17/30017
USPC .......................................... 715/205; 235/375
See application file for complete search history.

(56) References Cited

U.S. PATENT DOCUMENTS 4,070,778 A 1/1978 Mahler et al.
4,436,202 A 3/1984 Berkley (Continued)

FOREIGN PATENT DOCUMENTS

CA 2255185 A1 6/1999
DE 3744621 A1 4/1988

(Continued)

OTHER PUBLICATIONS

Robert Dale Beadles, U.S. Appl. No. 13/759,863, filed Feb. 5, 2013.

(Continued)

*Primary Examiner* — Mohammed-Ibrahim Zuberi
(74) *Attorney, Agent, or Firm* — Franklin & Associates International Inc; Matthew F. Lambrinos

(57) ABSTRACT

An apparatus and method for cloud-based storage, retrieval and sharing of files tagged with scannable tags and alphanumeric coding is provided. This application and method includes: either scanning a scannable tag by mobile device or inputting a code into a computer; decoding of the scannable tag or text provided, by installed application; accessing, by a cloud based storage system which hosts the associated or tagged file; and retrieving the file associated with the scannable tag or alphanumeric code. This method also includes a process by which: either by smart phone or personal computer; uploading or storing of files onto a cloud-based storage system; tagging of those stored files with a unique scannable tag and alphanumeric code; generating a scannable tag and alphanumeric code to associate with those tag files; and a method of transmitting scannable tag or alphanumeric codes between smart-phone users or computer uses for the purposes of sharing extra information with others using momentos.

22 Claims, 31 Drawing Sheets

Related U.S. Application Data application No. 13/759,863, filed on Feb. 5, 2013, now Pat. No. 9,158,770.

(60) Provisional application No. 61/711,216, filed on Oct. 9, 2012.

(51) Int. Cl.
*H04L 29/08* (2006.01)
*H04W 12/06* (2009.01)

(56) References Cited

U.S. PATENT DOCUMENTS

| | | | |
|---|---|---|---|
| 4,439,941 A | 4/1984 | Halperin | |
| 4,613,157 A | 9/1986 | Drabish | |
| 5,284,365 A | 2/1994 | Stuart | |
| 5,513,117 A | 4/1996 | Small | |
| 5,626,551 A | 5/1997 | Kearns et al. | |
| 5,829,790 A | 11/1998 | Phillips | |
| 5,892,441 A | 4/1999 | Woolley et al. | |
| 5,914,158 A | 6/1999 | McGuiness | |
| D457,555 S | 5/2002 | Stephens-D'Angelo | |
| 6,453,300 B2 | 9/2002 | Simpson | |
| 7,490,720 B2 | 2/2009 | Cole et al. | |
| 7,734,719 B2 | 6/2010 | Friedman et al. | |
| 7,751,069 B2 | 7/2010 | Wen et al. | |
| 8,095,534 B1* | 1/2012 | Alexander | G06F 17/30893 707/706 |
| 8,162,229 B1 | 4/2012 | Huse et al. | |
| 8,584,931 B2 | 11/2013 | Kim | |
| 8,990,674 B2* | 3/2015 | Shibukawa | G06F 17/30899 709/217 |
| 9,158,770 B1* | 10/2015 | Beadles | G06F 17/30017 |
| 2001/0018807 A1 | 9/2001 | Proulx | |
| 2004/0134690 A1 | 7/2004 | Norris, Jr. et al. | |
| 2005/0262217 A1* | 11/2005 | Nonaka | H04N 7/17318 709/217 |
| 2006/0282277 A1 | 12/2006 | Ng | |
| 2007/0039215 A1 | 2/2007 | Sheridan | |
| 2007/0162350 A1 | 7/2007 | Friedman | |
| 2009/0001150 A1 | 1/2009 | Care | |
| 2009/0043783 A1* | 2/2009 | Wakasa | G06F 17/30017 |
| 2009/0102657 A1 | 4/2009 | Evans et al. | |
| 2009/0327885 A1* | 12/2009 | Aoki et al. | 715/700 |
| 2010/0012714 A1 | 1/2010 | Weesner | |
| 2011/0025037 A1* | 2/2011 | Wilen | 283/56 |
| 2011/0043858 A1* | 2/2011 | Jetter | G06F 17/30017 358/1.15 |
| 2011/0209365 A1 | 9/2011 | Marsh et al. | |
| 2011/0247247 A1 | 10/2011 | Mayer et al. | |
| 2011/0258219 A1 | 10/2011 | Ross et al. | |
| 2011/0283172 A1* | 11/2011 | Berger et al. | 715/202 |
| 2012/0011751 A1 | 1/2012 | Schimke et al. | |
| 2012/0180348 A1 | 7/2012 | Keefe | |
| 2012/0181330 A1* | 7/2012 | Kim | 235/375 |
| 2012/0234907 A1* | 9/2012 | Clark et al. | 235/375 |
| 2012/0252405 A1* | 10/2012 | Lortz et al. | 455/410 |
| 2012/0284649 A1* | 11/2012 | Levy | 715/753 |
| 2012/0323699 A1* | 12/2012 | Phillips | G06Q 30/02 705/14.69 |
| 2012/0325902 A1* | 12/2012 | Goyal et al. | 235/375 |
| 2012/0330707 A1* | 12/2012 | Loucks | 705/7.13 |
| 2013/0008939 A1 | 1/2013 | Griffin | |
| 2013/0018726 A1* | 1/2013 | Ionescu et al. | 705/14.49 |
| 2013/0036635 A1 | 2/2013 | Mayer et al. | |
| 2013/0043302 A1* | 2/2013 | Powlen et al. | 235/375 |
| 2013/0117646 A1* | 5/2013 | Hansen | G06Q 30/0238 715/205 |
| 2013/0126598 A1 | 5/2013 | Beadles | |
| 2013/0226995 A1* | 8/2013 | Etheredge et al. | 709/203 |
| 2013/0248606 A1 | 9/2013 | Beadles | |
| 2013/0298001 A1* | 11/2013 | Lundberg | H04L 67/10 715/205 |
| 2013/0311519 A1* | 11/2013 | Deking | G06F 17/30879 707/803 |
| 2013/0334300 A1* | 12/2013 | Evans | G06F 17/30017 235/375 |
| 2013/0346452 A1* | 12/2013 | Lee | G06F 17/30557 707/805 |
| 2014/0008427 A1* | 1/2014 | Wesolek | G06F 17/30 235/375 |
| 2014/0059059 A1* | 2/2014 | Barman | G06F 17/30017 707/752 |
| 2014/0108606 A1* | 4/2014 | Beadles | G06F 17/30876 709/217 |
| 2014/0117076 A1* | 5/2014 | Eberlein | 235/375 |
| 2014/0181155 A1* | 6/2014 | Homsany | 707/812 |
| 2014/0224867 A1* | 8/2014 | Werner | G06F 17/30017 235/375 |
| 2014/0281855 A1* | 9/2014 | Bhatnagar | G06F 17/30879 715/205 |
| 2014/0337695 A1* | 11/2014 | Chakra | G06F 17/2235 715/205 |
| 2014/0365324 A1* | 12/2014 | Rothfuss | G06Q 30/0601 705/26.1 |
| 2015/0008256 A1 | 1/2015 | Beadles | |
| 2015/0019944 A1* | 1/2015 | Kalgi | G06Q 20/227 715/205 |
| 2015/0102098 A1* | 4/2015 | Adams | H04L 67/1097 235/375 |
| 2015/0205764 A1* | 7/2015 | Shropshire | G06F 17/212 715/205 |

FOREIGN PATENT DOCUMENTS

| | | |
|---|---|---|
| GB | 2471661 A | 1/2011 |
| RU | 83027 U1 | 5/2009 |
| WO | WO 99/24250 A1 | 5/1999 |
| WO | WO 2013/078255 A1 | 5/2013 |

OTHER PUBLICATIONS

Robert Dale Beadles, U.S. Appl. No. 13/925,724, filed Jun. 25, 2013.
Robert Dale Beadles, U.S. Appl. No. 14/081,766, filed Nov. 15, 2013.
Robert Dale Beadles, U.S. Appl. No. 14/216,878, filed Mar. 17, 2014.
Robert Dale Beadles, U.S. Appl. No. 14/226,829, filed Mar. 27, 2014.
Robert Dale Beadles, U.S. Appl. No. 14/269,164, filed May 4, 2014.
Robert Dale Beadles, U.S. Appl. No. 29/467,339, filed Sep. 18, 2013.
Robert Dale Beadles, U.S. Appl. No. 29/467,343, filed Sep. 18, 2013.
Robert Dale Beadles, U.S. Appl. No. 61/629,741, filed Nov. 22, 2011.
Robert Dale Beadles, U.S. Appl. No. 61/632,100, filed Jan. 17, 2012.
Robert Dale Beadles, U.S. Appl. No. 61/711,216, filed Oct. 9, 2012.
Robert Dale Beadles, U.S. Appl. No. 61/801,098, filed Mar. 15, 2013.
Robert Dale Beadles, U.S. Appl. No. 62/002,849, filed May 24, 2014.
International Search Report, dated Mar. 6, 2013, in International Patent Application No. PCT/US2012/066155, 4 pages.
Written Opinion of the International Search Authority, dated May 22, 2014, in International Patent Application No. PCT/US2012/066155, 5 pages.
International Preliminary Report on Patentability, dated May 27, 2014, in International Patent Application No. PCT/US2012/066155, 1 page.
Office Action, dated Aug. 1, 2013, in U.S. Appl. No. 13/894,896, 25 pages.
Amendment, dated Sep. 17, 2013, in U.S. Appl. No. 13/894,896, 11 pages.
Applicant-Initiated Interview Summary, dated Sep. 18, 2013, in U.S. Appl. No. 13/894,896, 3 pages.
Office Action, dated Sep. 26, 2013, in U.S. Appl. No. 13/601,922, 24 pages.
Office Action, dated Dec. 17, 2013, in U.S. Appl. No. 13/894,896, 35 pages.
Amendment, dated Jan. 30, 2014, in U.S. Appl. No. 13/894,896, 25 pages.
Final Office Action, dated Jun. 13, 2014, in U.S. Appl. No. 13/894,896, 13 pages.
Robert Dale Beadles, U.S. Appl. No. 14/327,502, filed Jul. 9, 2014.
Robert Dale Beadles, U.S. Appl. No. 14/332,385, filed Jul. 16, 2014.
Office Action, dated Jul. 2, 2014, in U.S. Appl. No. 14/106,656, 27 pages.

(56) References Cited

OTHER PUBLICATIONS

International Search Report and Written Opinion mailed Oct. 7, 2015, in PCT/US15/32331, 2 pages.
Robert Dales Beadles, U.S. Appl. No. 29/521,274, filed Mar. 21, 2015.
Office Action mailed Oct. 20, 2014 in U.S. Appl. No. 13/759,863, 9 pages.
Office Action mailed May 28, 2015 in U.S. Appl. No. 13/759,863, 6 pages.
Office Action mailed May 14, 2015 in U.S. Appl. No. 14/081,766, 15 pages.
Office Action Mailed Oct. 28 2015, U.S. Appl. No. 14/332,385, filed Jul. 16, 2014.
Office Action mailed Dec. 5, 2014 in U.S. Appl. No. 14/332,385, 9 pages.
Office Action mailed Jun. 30, 2015 in U.S. Appl. No. 14/332,385, 10 pages.
Robert Beadles, U.S. Appl. No. 14/873,106, filed Oct. 1, 2015.
Chinese Office Action of Jun. 18 2015, issued on Chinese Patent Application 201280067497.8, filed Mar. 6 2013 in the name of Robert Beadles, (Chinese national phase of International Patent Application No. PCT/US2012/006615, filed Mar. 6 2013).
Office Action mailed Jan. 20, 2015 issued on U.S. Appl. No. 14/216,878, filed Mar. 17, 2014 to Robert Dale Beadles.
Office Action mailed Mar. 26, 2015 issued on U.S. Appl. No. 14/226,164, filed May 14, 2014 to Robert Dale Beadles.
Office Action mailed Oct. 20, 2015 issued on U.S. Appl. No. 13/925,724, to Robert Beadles.
International Patent Application PCT/US15/32331, filed May 24, 2015 to Robert Dale Beadles.
U.S. Appl. No. 14/491,850, filed Sep. 19, 2014 to Robert Dale Beadles.
Office Action mailed Apr. 2, 2015 issued on U.S. Appl. No. 14/491,850.

* cited by examiner

- 201 Entity decides to mark item with 2D barcode
- 202 Using a computer application, entity uploads file onto cloud storage system.
- 203 2D bar code created and tagged to uploaded image.
- 204 Entity prints 2D barcode on item.
- 205 User inputs alpha numeric code into application by computer or cell phone.
- 206 User takes picture of 2D symbol with cell phone.
- 207 Cell phone decodes 2D barcode.
- 208 Software associates decoded 2D barcode or alpha numeric code with file uploaded on cloud storage system.
- 209 User's cell phone or computer displays stored file from the cloud storage system.

Fig. 2

| | | |
|---|---|---|
| | User accesses an internet capable computer or a smart phone. | 301 |
| | User accesses the internet or similar network using WLAN, LAN, WWAN or an equivalent internet connection (See Fig. 9 for sample embodiment of a network connection). | 302 |
| | User has previously registered with the smart phone mobile application or application website. | 303 |
| 304 — User logs on to Application by entering her user name and password. | | User logs on to Application website by entering user name and password. — 305 |
| | User has previously submitted videos (by methods referenced in to Fig. 2). | 306 |
| | User, through the application or website interface, is shown a camera roll where she may view all submitted data, including videos. | 307 |
| | User may modify, remove, add optional password protection, manage, or change QR codes associated with previously submitted videos. | 308 |
| | User may upload and post videos, through the application, to social media web sites. | 309 |

Fig. 3

MEMORYTAG HYBRID MULTIDIMENSIONAL BAR-TEXT CODE, BEADLES

13-1
13-2
13-3
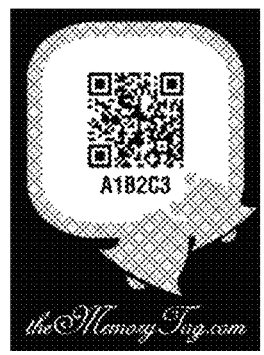
13-4
FIG. 13

28-01 LAYERED SCANNABLE TAG 29-01 LAYERED SCANNABLE TAG

APPARATUS AND METHOD FOR CLOUD BASED STORAGE USING A MULTI-LAYER SCANNABLE TAG

CROSS REFERENCE TO RELATED APPLICATIONS

This application claims the benefit of U.S. Provisional Application No. 61/711,216 filed Oct. 9, 2012, and U.S. non-provisional application Ser. No. 13/759,863 filed Feb. 5, 2013, U.S. continuation-in-part application Ser. No. 13/925,724 filed Jun. 24, 2013, and U.S. continuation-in-part application Ser. No. 14/081,766 filed Nov. 15, 2013,

STATEMENT REGARDING FEDERAL SPONSORED RESEARCH OR DEVELOPMENT

Not Applicable

REFERENCE TO SEQUENCE LISTING, A TABLE, OR A COMPUTER PROGRAM

Not Applicable

BACKGROUND

1. Field of Invention

Embodiments relate to mobile tagging, and more particularly but not exclusively, to mobile tagging utilizing multidimensional barcodes. Embodiments also relate to PC and other computer tagging.

2. Description of Related Art

Multidimensional bar codes, such as the two dimensional (2D) Quick Response (QD) (trademarked) barcode as described in Masahiro, U.S. Pat. No. 5,726,435 and Masahiro, Jap. Pat. No. 2938338, allow users to enjoy both the convenience of traditional print media and the completeness of online media. Multidimensional bar codes with embedded URL codes often appear in magazine articles, business cards, item tags, and advertisements. Individuals, who wish to supplement this published media, may do so by taking a picture of a 2D bar code with a camera enabled cell phone that will redirect them to the programmed URL. The programmed URL can contain unlimited information to supplement the published media, including a products details, videos or contact information. Publishers and users can also print their own 2D barcodes for others.

For the most part, 2D bar codes have been commercially unavailable to individuals who merely want to generate a bar code and associate it with a video, photograph or document. Ordinary consumers and small businesses, find that the expense of investing into this technology exceeds the benefit provided. Further, another difficulty in using this technology is that the URL or video link usually requires a published website or hosting server. Moreover, current 2D bar codes cannot be processed visually and typically require a scanning mechanism.

Cloud storage providers, examples of whom include: Google Drive (trademarked), Rapidshare (trademarked) or Mega, are based on a model of storage where users upload data onto third party hosted servers. Cloud storage providers own large data centers and allow their customers to pay to buy or lease storage capacity on these websites. Some providers, like Rapidshare (trademarked), encourage sharing of user-submitted data by generating unique URL links to user-submitted content. In turn, users share their content with other by providing a URL link to this content. Typically, those who wish to enjoy user-submitted content must download this content through the unique link. For these reasons, clouds storage has become an incredibly popular service for users to upload and share photographs, videos, documents and other information.

Cloud storage models contain numerous disadvantages. URL links are often difficult to input by a user, unattractive on the text, and out of place when inserted into printed media. Further, users are often forced to download content before they may access it. Moreover, the interface of a cloud storage system is not friendly for a novel user and the files are not easily retrievable and shareable.

Accordingly, there exists a need to provide an improved, more user friendly, 2D code tagging systems, storage system, and processes for retrieving these tagged images for mobile phones, computers and other electronic devices.

Current U.S. Classification: 283/75, 283/77, 235/494, 235/462.1, 235/462.9

BRIEF SUMMARY OF THE INVENTION

The present invention seeks to combine available and existing aspects of multidimensional tagging with the cloud storage's capabilities in a novel manner. This combination allows user to submit video, audio or other files onto a cloud based storage system. This process is achieved by and through an internet or network based network. The application tags each user submitted file by associating each file with a unique URL, 2D barcode and alphanumeric code. This hybrid multi-dimensional bar text code combination enables a user to, either with a 2D bar code or alphanumeric code, immediately view photographs, videos, audio files, or other data stored on a cloud storage system conveniently.

The present invention includes a convenient and easy storage system for users to submit their own video, audio or other files. One embodiment includes a cloud based file storage system where submitted files will be housed and linked with their tagged associated URL, 2d bar code and alphanumeric bar codes. In one embodiment, the user has the option to password protect their submitted files.

According to the preferred embodiment of this present invention, data is stored and tagged through the use of an electronic mobile application that is connected to the internet or network. This application stores user submitted data by processing it through a server that is connected to a cloud based database for storage, in one embodiment. Further, in one embodiment, this application tags user submitted data by associating files submitted by a user with a unique 2D barcode, alphanumeric bar code and a URL link. This application also grants the user many managerial functions over the submitted data including the power to delete files, add titles, add passwords, duplicate 2D barcodes, as well as other features. The application includes a component that allows a user to pay for the use of the application. Alternatively, the function of the above preferred embodiment may be performed by the application's website if the user should so choose.

An illustrative example of one embodiment of this present invention first starts with a person or business entity to producing a printed text such as a post card, sign, greeting card, advertisement or invitation to offer. Shortly thereafter, the person or business entity supplements their printed text with the hybrid multi dimensional bar text code of this present invention. Both the 2D barcode and text produced below said barcode are tagged and associated directly with a video, photograph, audio file, contact information, or other data supplied by the producing person or business entity and stored on this present invention's server. The printed text, along with the 2D barcode and alphanumeric code, is conveniently shared amongst friends, customers, businesses or provided for the general public to view.

Using the camera function of a smart phone, the user takes a photograph of the 2D barcode. Alternatively, the user may enter the alphanumeric code into a smart phone, computer or similar electronic device. The smart phone or personal computer then automatically initiates a communication with a third party cloud server, where the associated photograph, video, audio file, contact information or other stored data is retrieved for the user to listen to or view.

As a non-limiting example, a musical band, who is interested in promoting their music, will publish a printed advertisement, like a band poster, that includes a hybrid multi dimensional bar text code which they have associated with a sound file. A user captures a picture, using a smart phone, or inputs the alpha numeric number into his cell phone. Once the smart phone has processed the code or image, the smart phone transmits the audio file which is stored on a cloud based server. Thus, this present invention allows printed advertisements to be conveniently supplemented with media in a new and novel manner.

According to one aspect, there is provided a method for mobile or other computer tagging. The method can comprise: generating a hybrid multi dimensional bar-text code, wherein generating said hybrid code comprises generating a multi dimensional barcode including text symbols; tagging a video, audio or other file with said hybrid multi dimensional bar-text code by associating said generated hybrid code with said file; storing said tagged file for retrieval; and retrieving said tagged file utilizing said hybrid multi dimensional bar-text code.

According to another aspect, there is provided an apparatus for mobile or other computer tagging. The apparatus comprises: at least one processor operably connectable to a plurality of user devices; a data bus coupled to said at least one processor; a computer-usable medium embodying computer program code, said computer-usable medium being coupled to said data bus; and said computer program code comprising instructions executable by said processor and configured for performing the aforesaid method for mobile or other computer tagging.

A computer-usable medium for mobile or other computer tagging system, said computer-usable medium embodying computer program code, said computer program code comprises computer executable instructions configured for performing the aforesaid method for mobile or other computer tagging.

BRIEF DESCRIPTION OF THE DRAWINGS

FIG. 2 is a flow chart outlining another possible method of this present invention for a user of this present invention to tag and associate a file with a multidimensional bar code and alphanumeric code, and then the process by which a different user may then retrieve the associated file by only having access to the previous user's multidimensional bar code tag or alpha numeric code;

FIG. 3 depicts flow chart outlining one method of a registered user to access and manage associated file according to one embodiment, including removing videos, adding videos, posting links to social media websites, adding passwords as well as other options;

FIG. 10 is a block diagram that depicts a smart phone or mobile communication device with an attached camera and internet capabilities, in accordance with one of many sample configurations available that the present disclosure may function with;

FIG. 13 is a chart of various types of sticker-type momentos that users may use to stick onto substrates, such as envelopes for wedding invitations, for example, to provide invitees with access to extra information as mentioned previously.

DETAILED DESCRIPTION AND BEST MODE OF IMPLEMENTATION

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Figure 1:
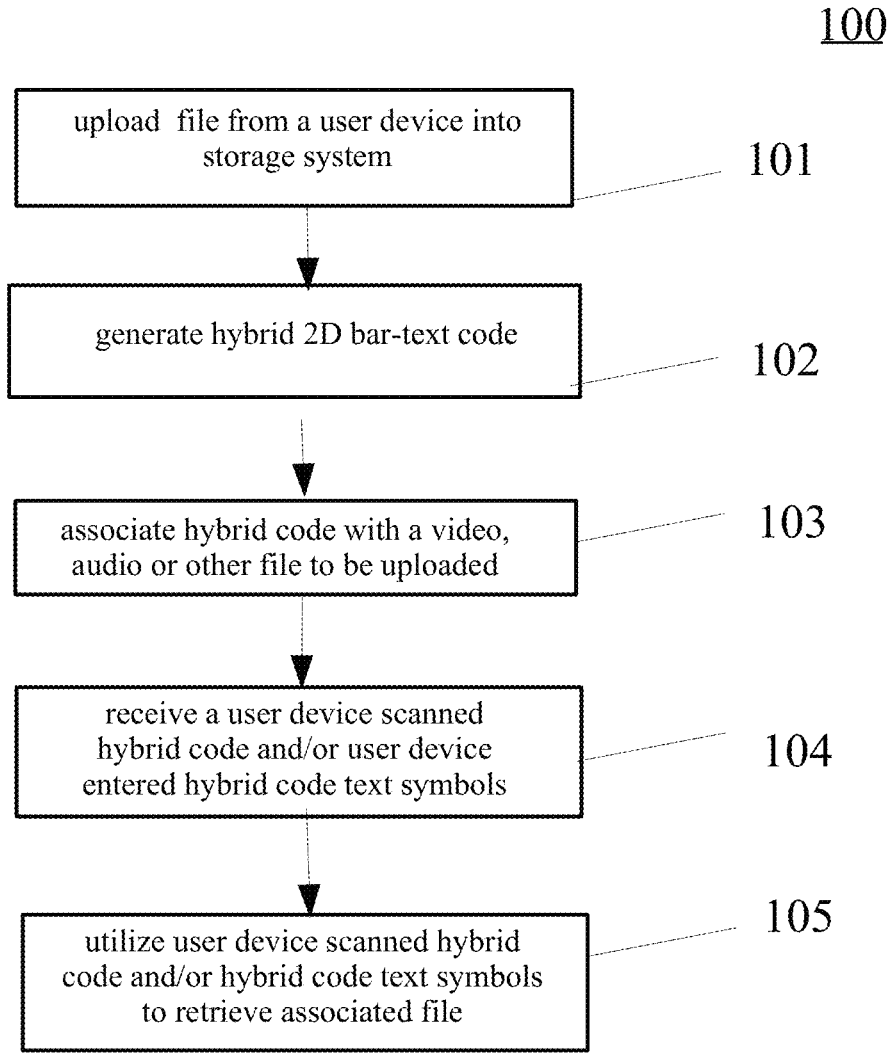
FIG. 1 is a flow chart outlining a method for electronic device tagging according to one embodiment.
Figure 4:
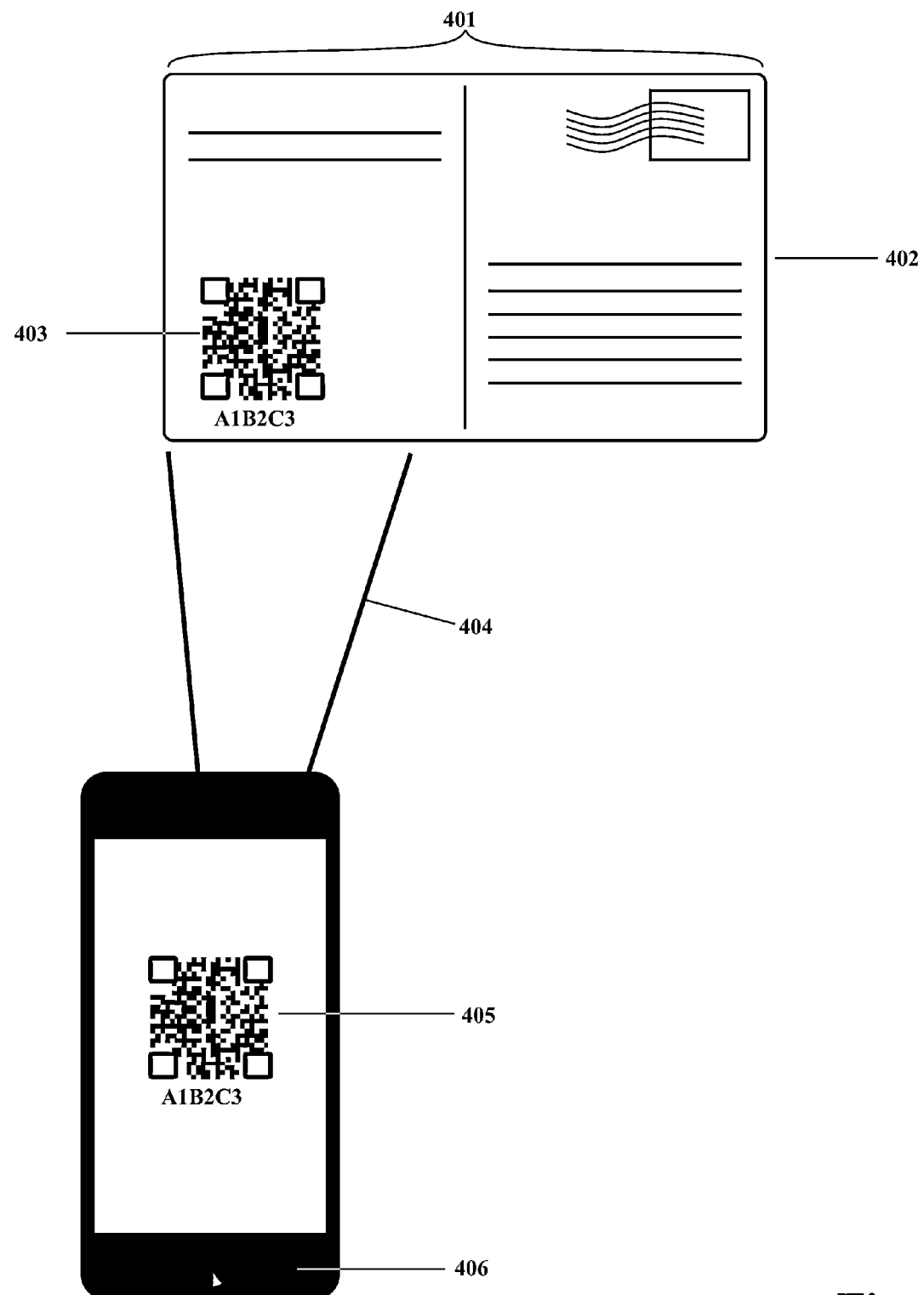
FIG. 4 depicts an illustrative shot of a mobile user taking a photograph of a postcard that includes a hybrid multidimensional bar-text code according to one embodiment.

FIG. 4 includes a diagram of a common two-dimensional (2D) barcode 403, which is an available technology that is improved upon according to the preferred embodiment of the present invention. As seen in FIG. 4, 2D barcodes 403 have the potential to store more information by using another axis to store information, whereas historical one-dimensional bar codes are limited only to a horizontal axis.

The most common and frequently used 2D barcode is the barcode symbology referred to as the Quick Response (QR) code, which have been standardized by the International Organization for Standardization. As seen in FIG. 4, the QR code consists of black square dots arranged around a square grid on a white background. Three black and white positioning squares 407 are arranged 3 corners—the top two corners and also the bottom left corner. On the other hand, the bottom right corner of a QR code contains an alignment square 408. Additionally, the three positioning 407 boxes are interconnected by a timing pattern 411. This timing pattern 411 appears as an alternating black and white pixel line that connects each positioning square 407. The positioning squares 407, alignment squares 408, timing pattern 411 provide a means for an electronic device to recognize the QR code and compute the data that is stored by the configuration of black and white dots within the QR code 409. Information encoded in the QR code can be almost any type of data. In one embodiment of the present invention, a QR code may be used to store URL addresses often referred to as hardlinking or object hyperlinking.

QR bar code tag systems do not allow for alpha numeric entry, in other words, a user can only access and create the file by scaning the QR code. By sight alone, a consumer will be unable to input a QR code into a computer. As a result, if a user does not have the QR code, there is no way for the user to access the user files. Such systems are by no means user friendly. Other multi dimensional bar code tag systems also, for example a one dimensional UPC code, require scanning of the barcode to enable files to be accessed.

Technical features described in this application can be used to construct various embodiments of methods and apparatus for mobile tagging or other computer tagging. In one aspect, the present invention system may comprise apparatus configured to perform functionality of the methods of the embodiments described herein. In another aspect, the present invention system may comprise software modules and instructions, which when executed by one or more processors, cause the processors to perform the functionality of the methods of the embodiments described herein.

In one approach, the method for mobile tagging or other computer tagging comprises generating a hybrid 2D bar-text code, wherein generating said hybrid barcode comprises generating a 2D barcode with included text symbols below. FIG. 4 includes an illustration of the preferred embodiments of this component of this present invention 403, referred to in here as a hybrid multi dimensional bar text code. This hybrid barcode 403 contains two components: the first, a 2D bar code 412; the second, a six digit alphanumeric code 413. The method described in this present disclosure further comprises tagging a video, audio or other file with the hybrid multi dimensional bar-text code by associating the generated hybrid code with the file. The method further comprises storing the tagged file for retrieval and retrieving the tagged file utilizing the hybrid multi-dimensional bar-text code.

Figure 8:
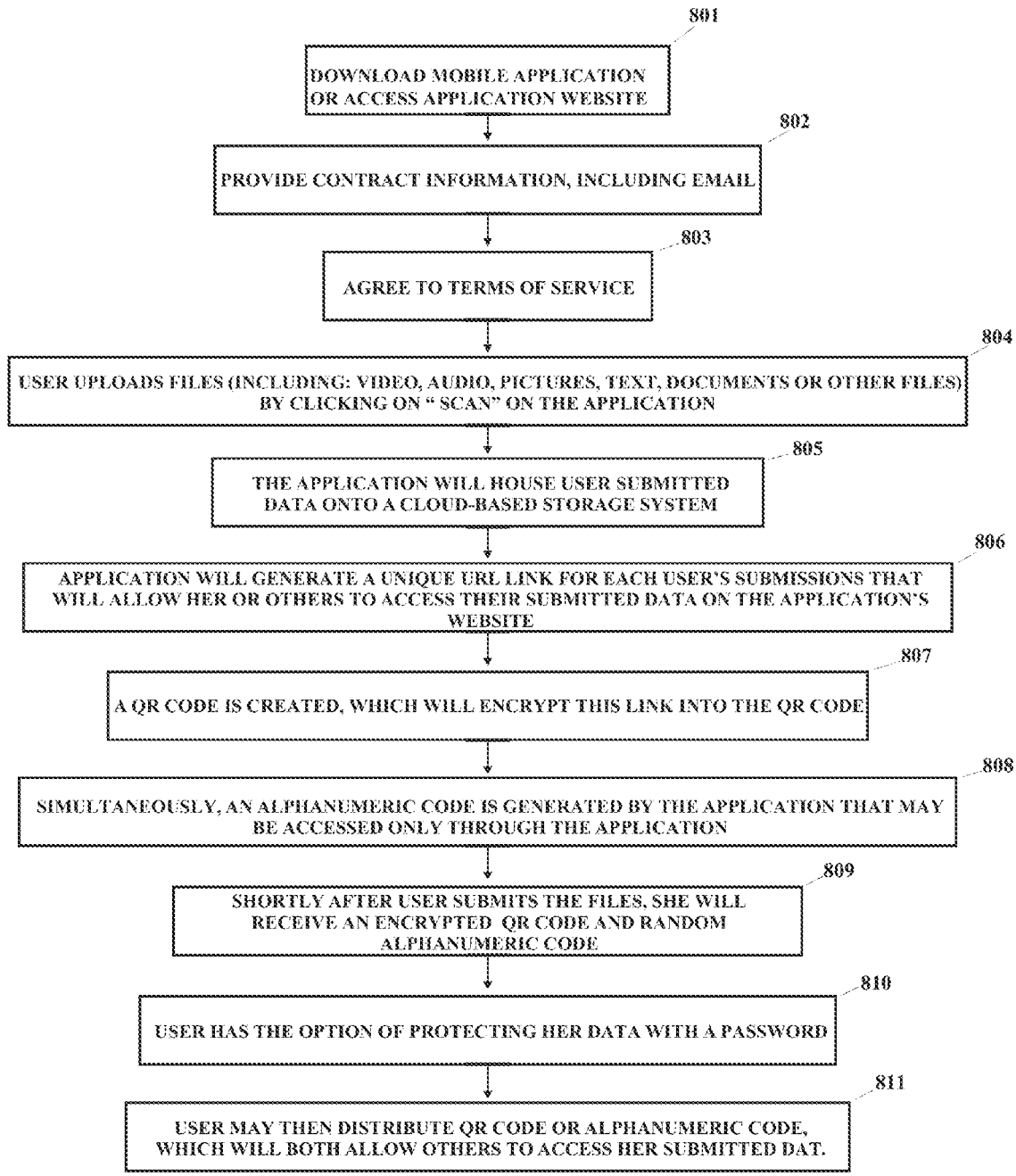
FIG. 8 depicts a flow chart outlining another method used by a new user of one embodiment of this present invention by which the user uploads a file and a process by which the application generates a unique URL link, 2D Code, and alphanumeric code for each file uploaded by the user according to one embodiment.
Figure 9:
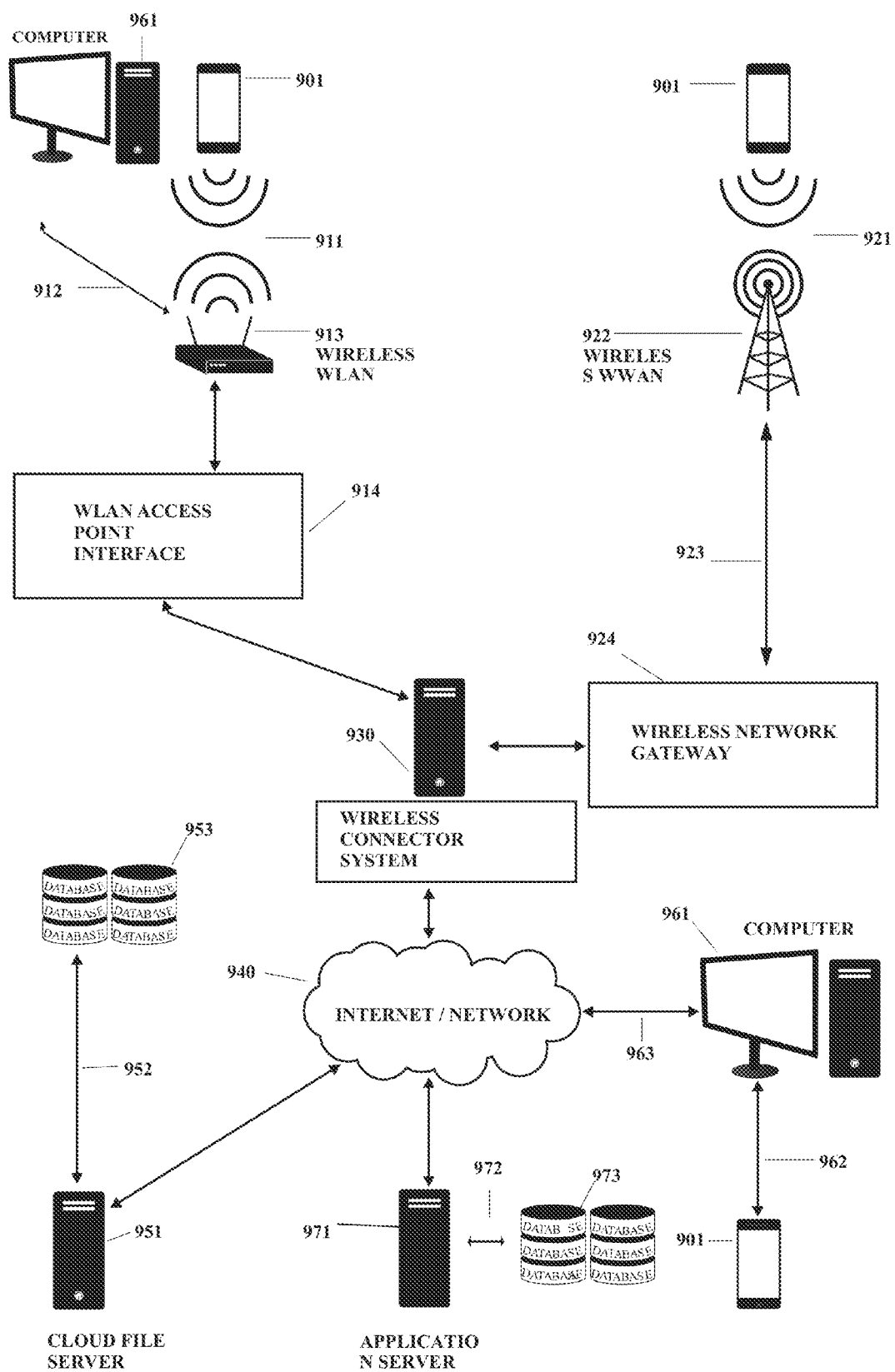
FIG. 9 is a block diagram depicting one of many available sample configurations of a network and internet communication system which include: a smart phone device, computer device, servers, and common network connections.
Figure 10:
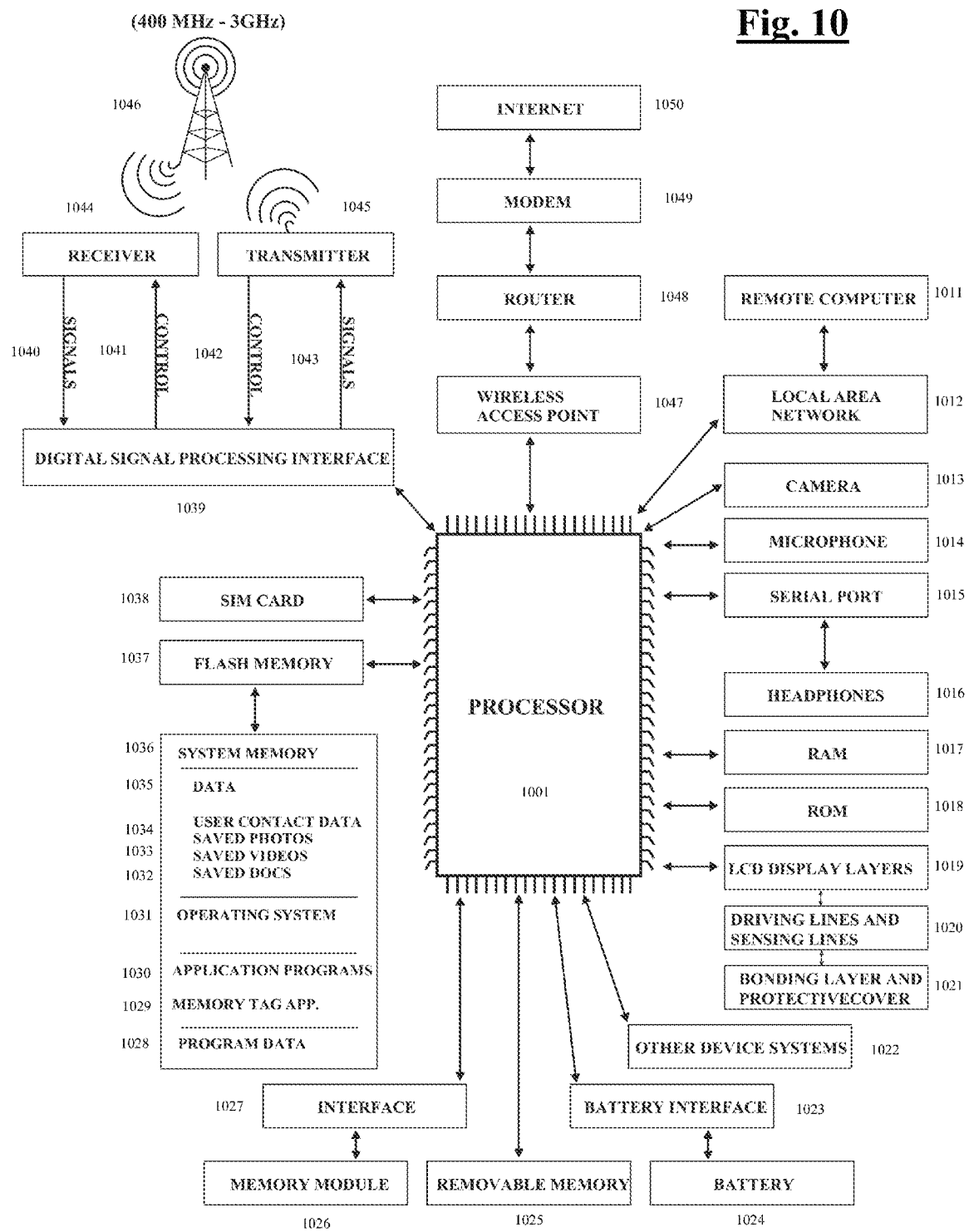

In one embodiment, FIG. 8, Steps 801-811, describe one possible method of both storing user submitted data and secondarily tagging user submitted data to unique hybrid multi dimensional bar text codes. This embodiment uses a mobile phone application program, or alternatively, a computer website. In step 801, the user downloads an application or accesses the application's website. Turning to FIG. 9, the user may download this application from an application server 951 by accessing the internet vis a vis wireless wlan internet 911, wireless wan internet 921, or another type of network connection. Referring back to FIG. 8, the application subsequently requires the new user to complete steps 802-803. The user then initiates the next step of the process, 804, by uploading her file (including, but not limited to: videos, audio, pictures, text, documents or other files) onto the application's servers by clicking a "scan" button or other similar button on the interface. Referring to FIG. 10, which is a block diagram depicting one smartphone to be utilized in the present embodiment, the files may be retrieved from the smart phone's system memory 1036. The user may choose to upload saved photos 1034, saved videos 1033, saved documents 1032 or other files. Alternatively, the user may decide to create a video, picture or audio video using the smart phone's camera 1013 and microphone 1014 features.

Returning to FIG. 8, and continuing the above mentioned preferred embodiment, the application then completes a process described in 805-809 after the user submits a file. First, the application will house user submitted data on to a cloud-based storage system 805. Turning to FIG. 9, one example of how an embodiment may store data is through a cloud file server, 951. The application in this embodiment requires network connectivity through either a Wireless WLAN connection 911, Wireless WWAN connection 922, or alternatively a direct computer connection 961. After a user submits data to the network or internet 940, the user submitted data is then exchanged 952 between the cloud file server 951 and a database 953. Under this present embodiment, such databases may be commercial database providers or a database within the cloud file server. One example of such a third party commercial data base data provider is Amazon or Google. In this present embodiment of a file storage system, the user's save data is also stored in the cloud based storage system and associated with the unique 2D code, alphanumeric code and URL associated with the image. In this present embodiment, data is stored on the application's cloud file server for an infinite period of time or until the application's system administrator or the user decide to remove stored data.

Referring to FIG. 8, and continuing the above mentioned preferred embodiment, the application will next tag a unique URL link to the submitted file 806. Turning to FIG. 9, this process may be completed by one possible configuration of this present invention on the application server 971. In one example of this present invention, the URL link is created on the application server 971, by combining unique pre-generated codes stored on the application server's database 973. In this example the function of the URL links will be preferably to tag or associate user submitted data with a unique URL link. The described generated URL link will also be tagged with and associated with the user's submitted data, which is stored through the cloud file server 951 and located on the cloud file server.

Figure 5:
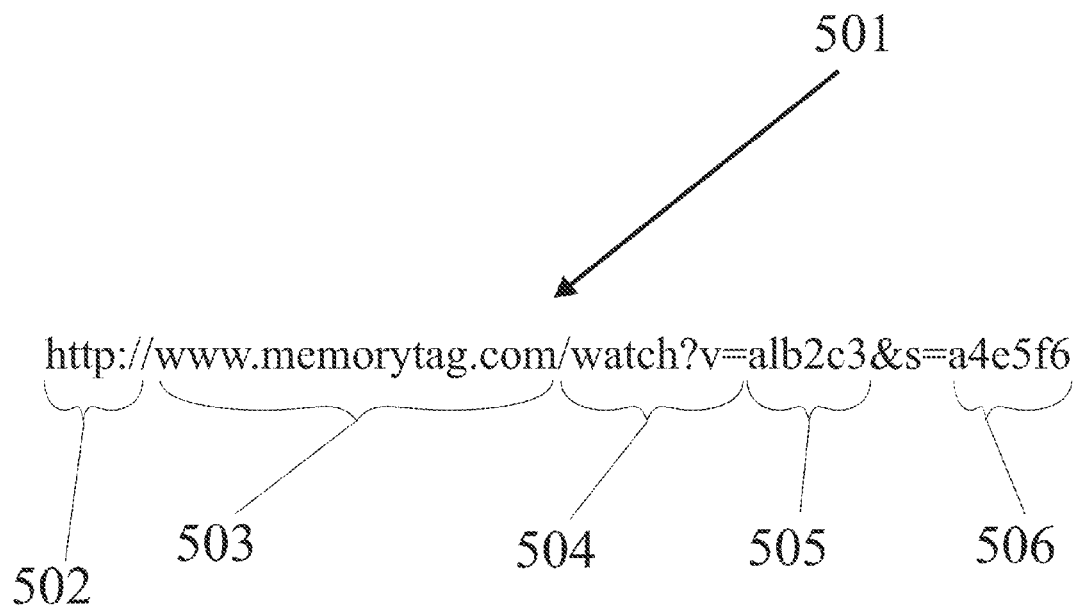
FIG. 5 is a text image of an example of one of the many URLs generated and utilized by the present invention for the purposes of tagging user submitted data.

Referring to FIG. 5, which is a specific text image of this present invention, one example of URL links generated in one embodiment of this present invention is seen in the text image shown in 501. This entire URL 501, includes a hyper text transfer protocol component 502, and a website address 503 that refers to a host name or the name of the website's server. This URL 501 also includes a component that will allow the user to hear audio, see videos or view documents based on an embedded player within the website 504. An example command to view videos may be 'watch?v=' as seen in 504. Further, the last part of the URL link 501 generated by this present embodiments preferably contains two parts, a short code 505 and a security code 506. In FIG. 5, the short code 505 is "a1b2c3" and the security code 506 is "d4e5f6." Each short code 505 has been pre-generated and the codes are stored in the application's database to ensure duplicity does not occur. For each piece of data stored onto the cloud server database, a unique short code shall be generated, associated or tagged on the application server. The security code 506, on the other hand, ideally performs one or more beneficial functions. In one example, the security code is used to ensure that the user possesses the associated 2D tag or alphanumeric code. In another example, the security code may be associated with an optional password entered in by the user after the user submits their video. Turning to FIG. 9, once a unique short code and security code have been generated the URL is complete and will be communicated 972 back to the sever 971 and in turn sent back to the user via the internet 940. The URL link will also be communicated to the application's cloud file server 951 where it is stored alongside the user's submitted data on the database 953. The method described in this step of the present embodiment is just one of many ways of doing this, and the present invention may be practiced in other embodiments which depart from the specifics set forth in this present disclosure.

Referring back to FIG. 8, and continuing with the above described embodiment, the application continues the process of tagging the user's submitted data by associating it with a generated 2D code 807. Using available technology, the generated 2D code will link and tag to the unique URL link generated in the prior step, 806. In one embodiment, each generated 2D code directly links, by use of a URL, to user submitted data stored on the application's sever. To further this association, the 2D code 807 is also associated alongside the saved data previously submitted, 804-805, by saving the 2D code alongside submitted data in cloud file server's database. Next, the application will generate an alphanumeric code, 808, which will be shown directly below the 2D code (previously generated in 807). Preferably, in one embodiment, the alpha numeric code generated in step 808 will correspond to the short code described in step 806. This association is also saved and stored in the application's database (not pictured).

Still referring to FIG. 8, and continuing with the above described embodiment, preferably, after the application has performed it's process of tagging user submitted data and saving this association in the database 806-808, the application will send back a message to the user to confirm that the data has been successfully stored (not pictured). The application or website, in this embodiment, will then display a copy of the 2D code and alphanumeric number 809. The application may deliver this unique saved 2D code and alpha numeric code 809 by: email addresses provided by the user in 802, through on on-screen displayed image, or by saving the data in the user's account under previously submitted files or a variety of other methods. The user may then choose to print the generated 2D code and alphanumeric code and attach it to the associated text. The user then will have the option, through the application, of protecting data from others to assess with a unique password 810. Other options or capabilities the present embodiment of this invention may have is to allow the user to add a title description, share the data with social media websites or upload additional files 810. After these steps are completed, the user may then distribute the hybrid multi dimensional bar text code generated in 805-808 to others, which will allow them to access her submitted data through the use of a smartphone or home computer. Through the steps disclosed in FIG. 8, the user's data is stored onto a cloud based file server and tagged with the multidimensional bar text code of this present invention.

Embodiments may be practiced in many different methods. One example, the present invention may be used by an entity, business or group in conjunction with mass produced advertisements, such as but not limited to flyers, posters, brochures, pamphlets, business cards, magazine advertisements, newspaper advertisements, display racks, invitations and the like by including 2D Codes and alphanumeric codes generated by the present invention onto printed advertisements. In another example of this present invention, unique previously generated hybrid multi dimensional bar text codes may be pre-printed on to postcards, birthday cards, picture frames, special event cards, ecards, invitations, announcements, stationary and the like for the user to supplement with their own videos. In this embodiment, involving regenerated hybrid multi dimensional bar text codes, the processes of associating submitted images, videos, or other files may take different steps but still fall within the disclosures of this present invention.

Embodiments may be practiced in many different environments. By way of example, the memory tag hybrid multidimensional bar-text code system of embodiments may be implemented on at least one network server site in conjunction with at least one user processor apparatus, such as but not limited to video camera devices; mobile telephone devices; smart phone devices; tablet devices, portable processor devices; personal computer (PC) devices; surveillance devices. The network server site (see for example website server of FIG. 9) may be provided within a network which, for preference, is the Internet, but equally can be any one of, combination of, or interconnection of, but not restricted to: a local area network (LAN); a wide area network (WWAN): a home network; and a wireless network. The user processor apparatus communicates with the network server site over a telecommunication network and/or internet etc.

Figure 7:
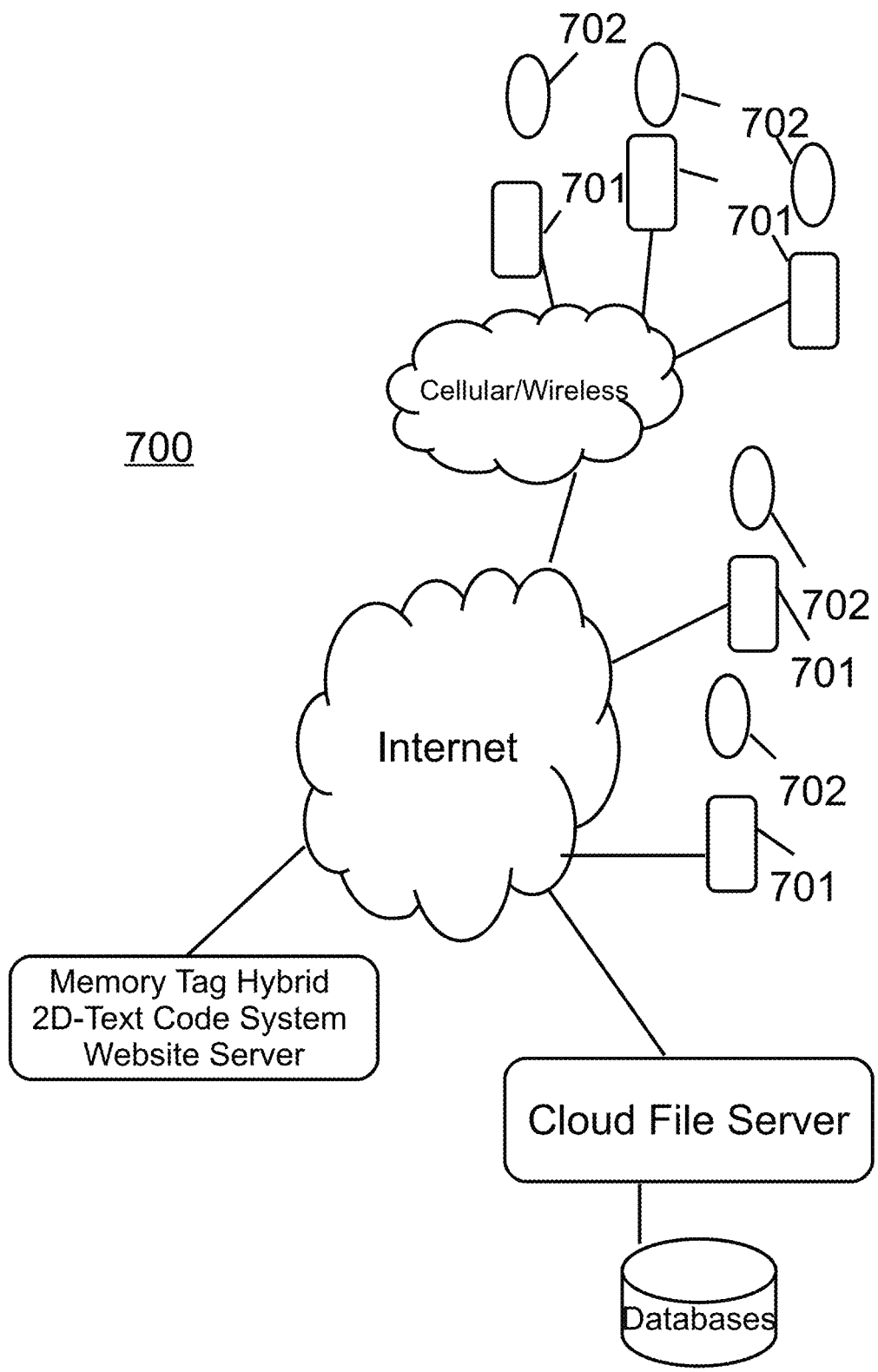
FIG. 7 is an exemplary schematic diagram of one of many different environments wherein the embodiments may be practiced.

A non-limiting exemplary schematic diagram of one of many such different environments wherein the embodiments of the memory tag systems and methods may be practiced is depicted in FIG. 7. A cellular telecommunication network, and/or internet, interconnects user devices 701 and the memory tag system website server. A cloud file server and database stores files uploaded in response to the website server receiving instructions from users 702 via user devices 701. A database (not shown) stores generated hybrid codes for access by the system. The memory tag system associates the files with hybrid codes.

The non-limiting specific exemplary schematic diagram of one of many such different network environments wherein the embodiments of the memory tag systems and methods described in this present disclosure may be practiced is depicted in FIG. 9. FIG. 9 describes the various different methods that a user of this present invention may connect to network or internet 940, through either an internet capable smart phone 901, or an internet capable personal computer 961. The first method described method in this specific exemplary diagram that a computer or smart phone may use to connect to the internet is through a local area network (LAN) connection 963. The computer, 961, connects a networking cable into the network 940. The smart phone 901 my too connect to the network 940 by directly connecting into the computer 961 through a networking connection 962. Turning to FIG. 10, this connection is made possible by the processor 1001, which is connected to a Local Area Network 1012 connected to a remote computer 1011. Turning back to FIG. 9, although the LAN connection described in 962-963 may be currently unavailable for the internet, it remains a feasible alternative use of this present invention in one embodiment.

A second example of a non-limiting exemplary diagram of one of many such network environments is further seen in FIG. 9. 911-914 demonstrate how a computer 961 or smart phone 901 may connect wirelessly or wired into a wireless WLAN system 913. First, the smart phone or computer must have an installed wireless card or wireless compatibility, and then it connects through the Wireless LAN device wirelessly 911 and 912. Alternatively, the computer or smart phone may connect to the wireless WLAN system through an Ethernet cable, 912. Next, the wireless WLAN device connects to a WLAN access point interface 914. Instead of a WLAN access point interface 914, it is feasible that some network systems will have a wireless network gateway 924, with integrated firewalls. After, the system connects to a wireless connector system, 930. If this wireless systems connector 914 is to be connected to the internet, the wireless systems connector must connect to an internet service provider (not shown) before the user may access the internet. This wireless system device is capable of connecting into the internet or designed network, 940. A third example of a non-limiting exemplary diagram of one of the many such network environments is shown in FIGS. 9, 921-924 and 930. This third example is based on a wireless wide area network (WWAN) connection, commonly used by smart phones and mobile technology networks. Non-limiting examples of currently WWAN providers include: T-Mobile, Sprint, Verizon, MetroPCS, and AT&T. First, the smart phone or feasibly a computer would transmit a signal to the Wireless WWAN receiver or tower 921. The signal then would be transmitted 923 to the Wireless Network Gateway 924 of the WWAN internet service provider. The WWAN internet service provider, after authentication, authorization or any similar process, then will transport the signal to a wireless connector system, 930 which will connect directly to the internet or network 940.

Continuing with FIG. 2, in an exemplary embodiment of the present design, steps 201-204 describe the process that an entity or individual will use to tag a published advertisement, text, postcard or the like with an associated file (including: audio, video, text, or other file) with a hybrid multi dimensional bar text code that is printed on the media. Steps 205-209 describe the process that a user, who has received a published advertisement, to retrieve the associated file by inputting either the 2D Code or alpha numeric code into a cell phone or computer. First, an entity will decide to mark an item or piece of data using the application described in this present invention. Unique hybrid multi dimensional bar text codes are stored in the system's cloud server 201 and the entity will then print the hybrid multi dimensional bar text code onto the item 202. Then, using an embodiment of an application of this present invention, the entity will upload that file 203 onto the cloud storage database maintained by the application. The file uploaded by the entity 203 will become tagged and associated with both the 2D bar code and text code on the printed advertisement 204. Now, turning to the user, she will first receive the advertisement or other text prepared by the entity with an included hybrid multi dimensional bar text code. Next, a user will have an option to either: input the printed alphanumeric number into an application 205; or, alternatively, the user may take a picture of the 2D Code 206 which will be automatically decoded by her cell phone 207. Using either method, the user will reach the application website where she will be able to access the data tagged by the 2D code or alphanumeric code 208. The data, having been uploaded previously, would have been stored on the application's cloud file database and made available by the cloud server. Finally, the application displays the stored information on the user's smart phone or computer 209.

In one example of this embodiment, an artist decides to promote their new album by publishing a band poster. Using the present invention, they are able to associate a sound file stored on a cloud based server with a hybrid multi dimensional bar text code. This hybrid multi dimensional bar text code, which is associated with the artist's top music track, appears is printed onto the artist's band poster. A user, who is interested in hearing the artist's track after seeing the album poster, is able to hear the stored music file by input the 2D Code or alphanumeric code into her smart phone or computer.

In another example, the application software configures hybrid multi dimensional bar text code into printable files which are provided to the user device to enable the user to print off the hybrid 2D text code onto individual labels or directly print or attach to end products. The user can place the code on anything and have details for it. By way of non-limiting example, for a greeting card, a user can record a personal video message to their special someone using their smart phone and associate the video message file to an hybrid multi dimensional bar text code using the application of the present invention. The user can simply print off the code onto an adhesive backed label and stick the hybrid multi dimensional bar text code label on the greeting card. When the recipient gets the card, the recipient can use their smart phone or pc and the memory tag system to view the video message from the giver by scanning the code on the greeting card. In another non-limiting example, the user can stick the hybrid multi dimensional bar text code on a picture and upload a video or audio message describing the picture. Anyone who scans the 2D code or types in the alpha numeric code can listen or watch the person tell them what the picture is about. In another example, the barcode is pre-printed on post cards previously and the user simply has to associate a video message to the barcodes and alphanumeric codes.

The memory tag hybrid multidimensional bar-text code apparatus and methods of some embodiments capture different data and uses different databases. In one example, the hybrid 2D code uses both alpha and numeric and even symbols to further allow ease of use and protection for the user. The hybrid 2D codes while being generated capture the users name, phone, address and email a copy to the user for later usage or records in case of loss. The files are stored for an eternity where others only for 20 to a 100 years. The system can be used by anyone with a simple skill set to create and share their own personal messages for any occasion for any medium.

In one example, the software application is configured to create an infinite amount of hybrid 2D codes that have alphanumeric and even symbols then stores them in a database to be assigned to future users. The software application for generating and assigning the codes, for upload and storing the files and recording information work in harmony together capturing and storing all data, statistics stc.

Figure 6:
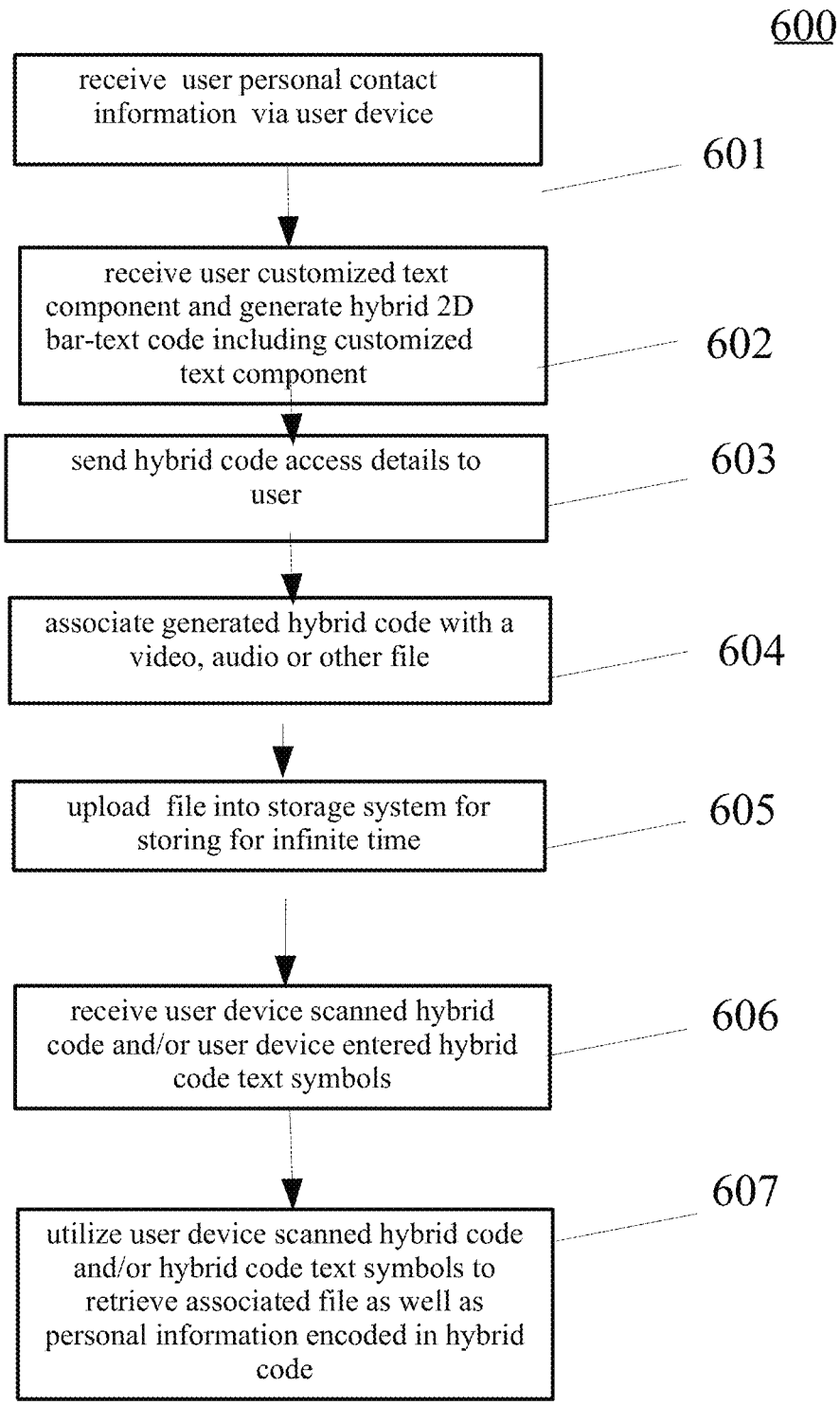
FIG. 6 depicts a flow chart outlining a method for electronic device tagging according to one embodiment.

In yet another example, the software application is configured to enable the user device, under control of the user, to design and customize the hybrid multidimensional bar-text code that is to be associated with the uploaded file. FIG. 6 is a flow chart outlining a method for mobile tagging according to one such example. In one non-limiting example, the software is configured to enable the user to utilize the user device to decide on the text component of the hybrid multidimensional bar-text code. In this manner, the user can enter via the user device a particular text code, e.g. alphanumeric and even symbols, that is easy to memorize. In another example, the user can operate the user device to select from some options that are easier to memorize. The software application generates a hybrid multidimensional bar-text code in which the text component corresponds to the user entered or selected code.

Turning now to FIG. 10, which represents an exemplary example of one of the many configurations of a camera enabled smart phone which may be used for the present invention. FIG. 1047-1050 represents another non-limiting example of a possible configuration of a WLAN internet or network connection this present invention may be connected to. Next, FIG. 1039, 1040-1046 show another non-limiting example of a WWAN internet/network connection. Finally, 1012-1011 show a direct LAN connection for the present invention. All three alternatives are connected to a central processor 1001, where data is processed through commands and instructions.

Remaining on FIG. 10, non-limiting example smart phone configurations aimed to store data are shown in 1028-1036. A typical smart phone stores saved information on a flash memory card 1037, although other methods are feasible. The application, or similar application of this present invention is stored at 1029 under application portion 1030 of the system's memory 1036. The data portion 1035 stores saved data, including: contact data, saved photos 1034, saved videos 1033, saved documents 1032 as well as other saved files. Also saved is the operating system 1031 and program data 1028. Although not to common, alternative designs may feasibly store saved photos, videos, or documents by using a sim card 1038, rom memory 1018, ram memory 1017, or removable memory 1025.

Remaining on FIG. 10, non-limiting examples of smart phone configurations that enable a user to input 2D codes or alphanumeric codes of this present invention are shown in 1019-1021 and 1013. The camera component of a smart phone 1013 may be used to take a picture of a printed 2D Code of this sample invention. Once user has captured a 2D code with the camera 1013, the information is relayed to the processor 1001 and another running application such as the operating system 1031 recognizes the 2D Code of this present invention. The operating system 1031 then will open either an internet browser 1030 or launch the memory tag application 1029, if installed. This process allows the user the file associated with the 2D Code. Alternatively, a user may use 1019-1021 to input an alpha numeric code using a smart phone's touch screen. First, the user will be shown an on screen keyboard display 1019, and will then manually input the alphanumeric code of this present invention. Driving and sensing lines 1020, will sense the user's manually inputted alpha numeric code, and relay the information to the processor 1001 who will check for errors. A bonding layer and protective outer glass cover 1021 encase the two layers described 1019 and 1020, so a user's touch will not destroy the phone. The inputted alphanumeric code will then retrieve the stored tagged file associated with the alphanumeric code.

In one example, the process of retrieving the tagged file utilizing the hybrid multi dimensional bar-text code may be implemented by scanning the multidimensional bar component of the hybrid code using the user device (mobile, PC, etc.) as the scanner, decoding the hybrid code and using the decoded contents to look up and retrieve the file associated with the hybrid code. In one example, the multidimensional bar component is a two dimensional barcode. For example the two dimensional bar code may be a 2D code. In another example, the component may be a datamatrix. In another example, the multidimensional bar component is a three dimensional bar code.

In another example, the user may optionally enter, via the user device, the text component of the hybrid code, that is, the characters, alpha, numeric, and/or symbols etc. of the text code included in the hybrid multi dimensional code. Text is used herein to mean any characters, alpha, numeric etc. or symbols that can be entered through texting operations on the mobile user device. ABCD123!@# is an example of such text. The tag system then utilizes the text component to enable the user to look up and retrieve the file associated with the hybrid code.

In one approach, a simple smartphone or PC downloads an application that allows the user to create their own personal audio or video message. The software then assigns hybrid multi dimensional bar text code to their file, the file is then stored for eternity. This personal message can be something as simple as a grocery reminder to a special message to a loved one on a greeting card.

FIG. 4 depicts an illustrative example of one method of using one embodiment of this present invention. 401 shows a post card sent by a friend or associate and delivered to the user of this present invention 402. This post card 401 contains 402, but also one embodiment of the hybrid multi dimensional bar text code of this present invention 403. The 2D Code and alphanumeric code 403 is affixed to this postcard by tape, a sticker, glue, printed or has been previously preprinted on the post card. The user, who is interested in supplementing the text of the post card with the video embedded in the code, uses a smart phone 406, through its camera function 413, to capture an image of the hybrid multi dimensional bar text code of this present invention 404. By this process, the user's phone will immediately recognize the 2D tag and grant the user access to the data associated with the 2D tag.

The hybrid 2D code allows the user to scan the hybird 2D code or go directly to the application website and type in their alpha numeric and symbol code (text code) to view the files. Unlike known tag systems in which lose of the 2D code results in the user never being able to recover the data, the app and software of one or more embodiments captures the users name, phone#, email address and sends them confirmation codes to view and use the 2D code in the case they lose or missplace the physical 2D code to scan or use the alpha numeric symbol code. It allows people to create a scanable and alpha numeric 2D code personal video or audio file that's easy for anyone to create or view.

Figure 11:
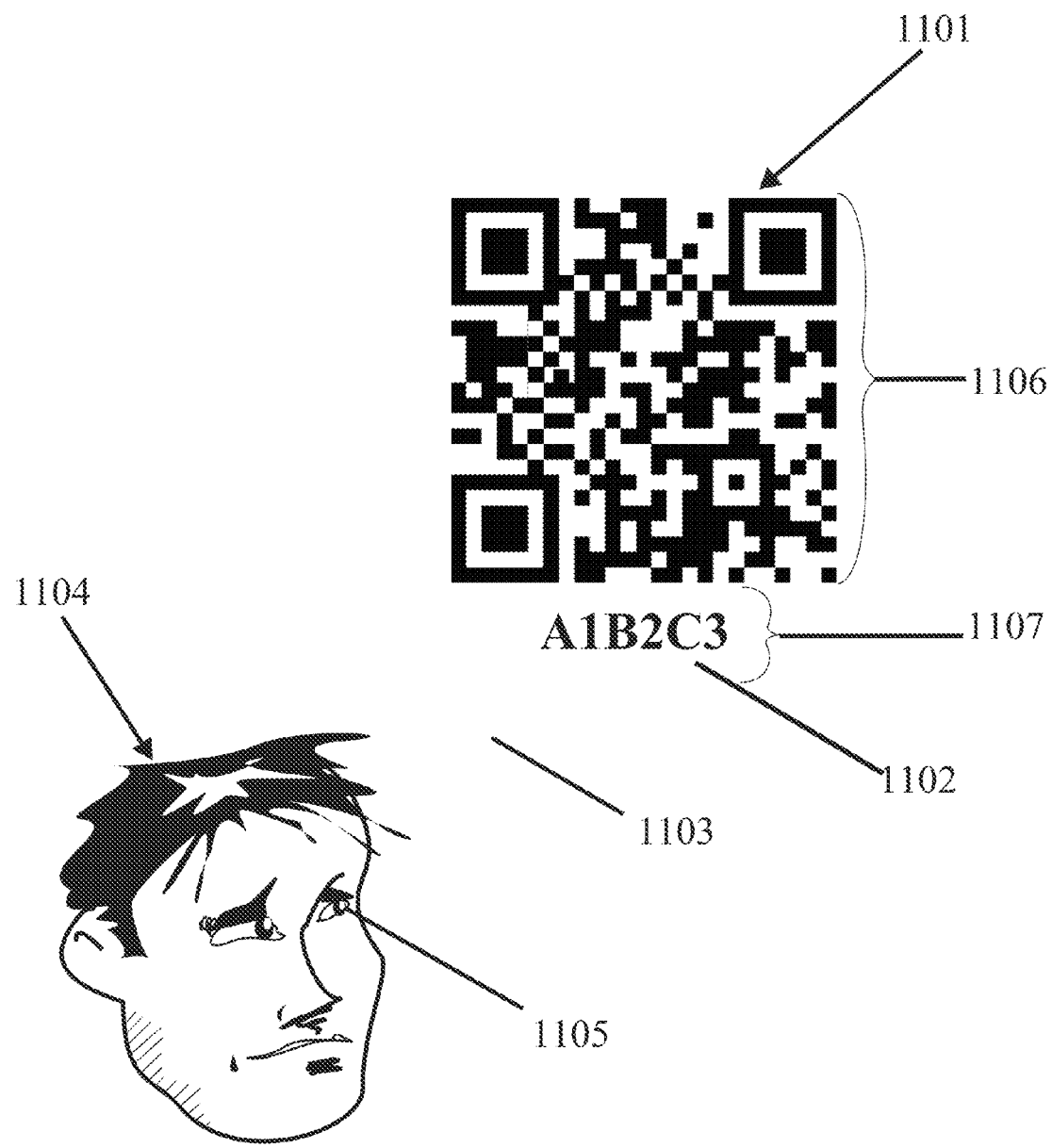
FIG. 11 is an illustrative example that depicts a user one method of using this present invention involving the use of a hybrid multi dimensional bar text code and the user's physical sense of vision provided by their eyes.

FIG. 11 depicts an illustrative example of one method of using one embodiment of this present invention. 1101 shows the hybrid multi dimensional bar text code of this present invention, affixed to a text that a user 1104 wants to supplement. The 2D code and alpha numeric code 1101, contains two parts: first, the 2D Code 1106, and second, the alphanumeric code 1107. The user 1104, who does not have a smart phone will find it very difficult to input the 2D Code 1106 into any machine. However, the user 1104, can easily recognize the alphanumeric code 1107. Using a user's 1104 eyes 1105, the user simply has to look 1103 at the alphanumeric code 1102 to process this information. Through the online application, either by cell phone or internet, the user 1104 will input the alphanumeric code 1102 that he recovered by vision 1103 into the application. The application, in turn will retrieve the stored data and show present it to the user.

Software and apps from smartphone or pc create a unique, scanable, 2D code with alpha numeric functionality that allows the user to create, share and view a video or audio file, safely stored and accessible for eternity, viewable and accessible from PC or smartphone.

In one example, the system retrieves the file associated with a hybrid code by using the text component, e.g. the alphanumeric code, of the hybrid code to first retrieve the hybrid code in a database or other storage area. The file associated with the hybrid code can then be accessed using the retrieved hybrid code.

Turning now to FIG. 3, FIG. 3 is an example of one embodiment of this present invention that involves the application of this present invention. Through the use of the application, a user may manage uploaded files and the user may also modify each associated file's 2D Code and alphanumeric code. Steps 301-305 describe the process by which a user will log on the application. First, the user accesses an internet capable smart phone or computer 301. Next, the user will access the internet 302. After, the user will access the mobile application or the application's website 303. A user who has not accessed the mobile application on their internet-capable smart phone may download the application through the internet and register the application (not shown). A user who has previously accessed the application on their internet-capable smart phone will have to log on to the application with her unique username and password 304. Any user may access the application's website and simply manually input the alpha numeric code 305 that the file is associated with. If a video or other file is password protected, under this present embodiment of this present invention, the user must enter the password 306. A prior user, who has already uploaded videos, will then be shown an interface where her submitted videos are stored 307. In this interface, the user may decide to add additional videos either recorded at that time or stored in the device she is using. She then may modify files, remove files, add password protection, change associated hybrid multi dimensional bar text codes through the interface 308. Another option the user has is to post videos or other files onto social media websites 309. One example of a method of sharing the user's submitted videos with a social media website 309 would include removing the security code generated by the URL link through the application's server and allowing social media users to access the video by an embedded player. The user's management options of previously submitted files are by no means exhaustive nor are the methods exhaustive.

Figure 12:
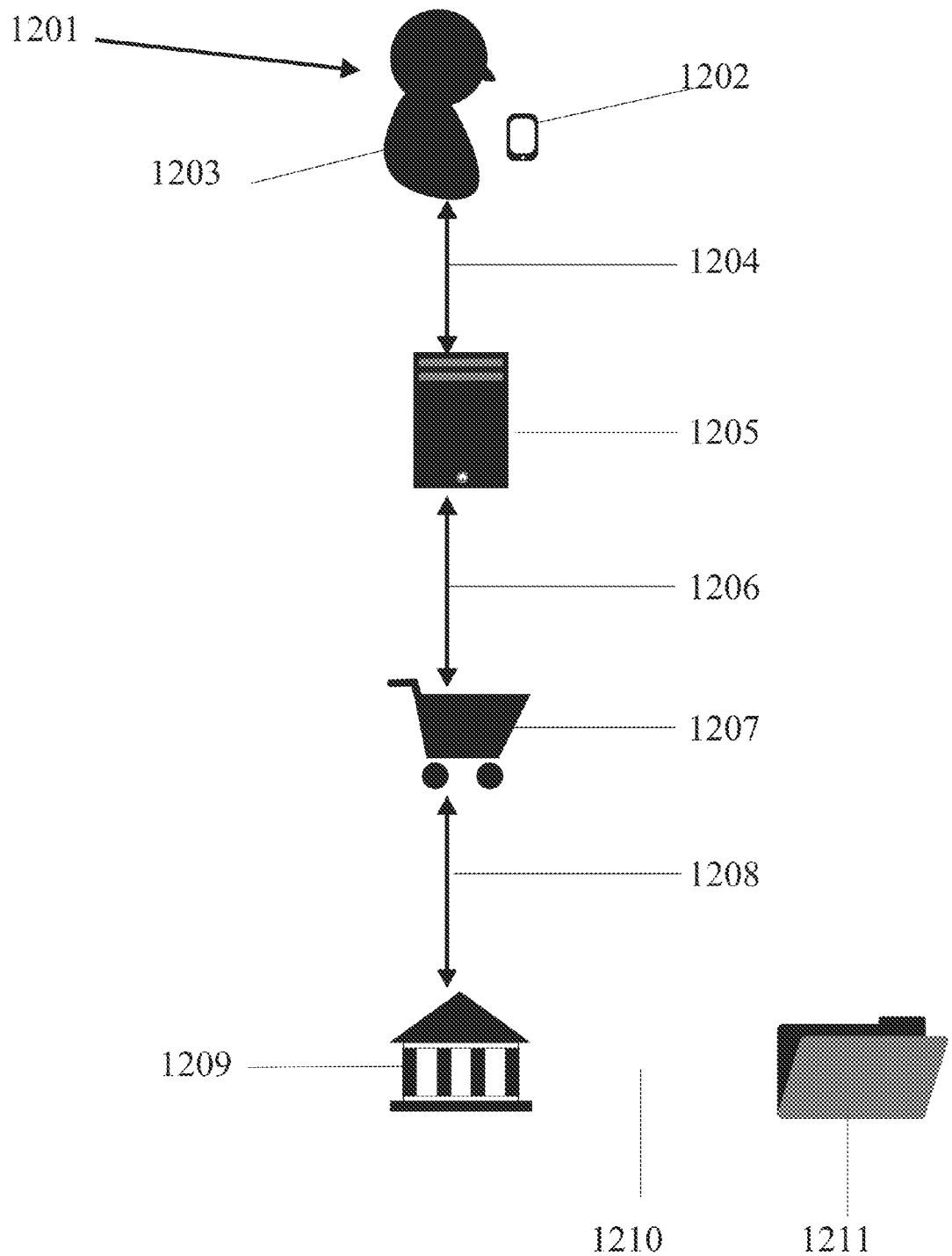
FIG. 12 is a block diagram that depicts one of the many available methods by which users may set up a subscription for the application of this present invention by the use of a payment gateway, merchant account and a bank.

FIG. 12 is a block diagram illustrating one of the various ways of online merchant processing available for this present invention. According to one embodiment of this present invention, a user of this application may be changed a small annual or monthly fee in order to upload, tag and store files onto the application's server and data base. Turning to FIG. 12, the user 1203 has obtained an internet capable smart phone or computer 1202. The user, through his smart phone, 1201 will agree to the terms of use of the application provide the application with payment information and agree to a subscription. This order, in turn, is transmitted 1204 to the application's server 1205. The application's server will then make a request 1206 to the payment gateway 1207. Nonlimiting examples of some payment gateways include authorize.net. Next, the payment gateway 1207 will make a request for confirmation 1208 to the user's bank 1209. The user's bank then will respond 1208 to the payment gateway. This response 1208 is communicated 1206 back to the application's server 1205 by the payment gateway 1207. The application's server will then respond 1204 to the user subscribing to the application 1201. If the application user's 1201 bank 1029 has authorized the request for confirmation 1208, the user will have successfully subscribed to the application for a monthly or yearly basis and the user's bank 1209 next will transfer funds 1210 to the application's merchant account 1211. However, if the user's bank 1209 has not authorized the request 1208, the user 1201 will have to submit a new order 1204 and start this process all over again until a favorable response is secured by the bank.

In another embodiment of this present invention, users who upload, store and retrieve photos, videos, or other files using the application system of this present invention are not charged a monthly or yearly subscription. Under this present embodiment, the application is free to use, but there will be advertisements provided by third party advertisement companies. Each advertisement may appear somewhere in the interface of the present invention or website by a video, photo or audio file. Advertisers will support the application by remitting payments to the application's merchant account based on the amounts of advertisements transmitted, amount of advertisements clicked or other calculations the advertiser agrees to. In another embodiment, a user may agree to a subscription, as seen in FIG. 12, in exchange for the application removing advertisements.

In another embodiment of this present invention, examples of momentos are provided utilizing this present invention involving the use of a hybrid multi dimensional bar text code. FIG. 13 is a chart of various types of sticker/seal-type momentos that users may use to stick onto invitations or envelopes for wedding invitations, for example, to provide invitees with access to extra information as discussed previously, where the present invention includes a convenient and easy storage system for users to submit their own video, audio or other files. One embodiment includes a cloud based file storage system where submitted files will be housed and linked with their tagged associated URL, 2d bar code and alphanumeric bar codes. In one embodiment, the user has the option to password protect their submitted files.

These seal momentos can be used for various holidays, including, but not limited to wedding invitations (13-1, 13-4), Valentine's day (13-2) or anniversary celebrations (13-2), or other celebrations such as birth announcements (13-3), all of which may be used for other purposes as the user deems fit.

Figure 14:
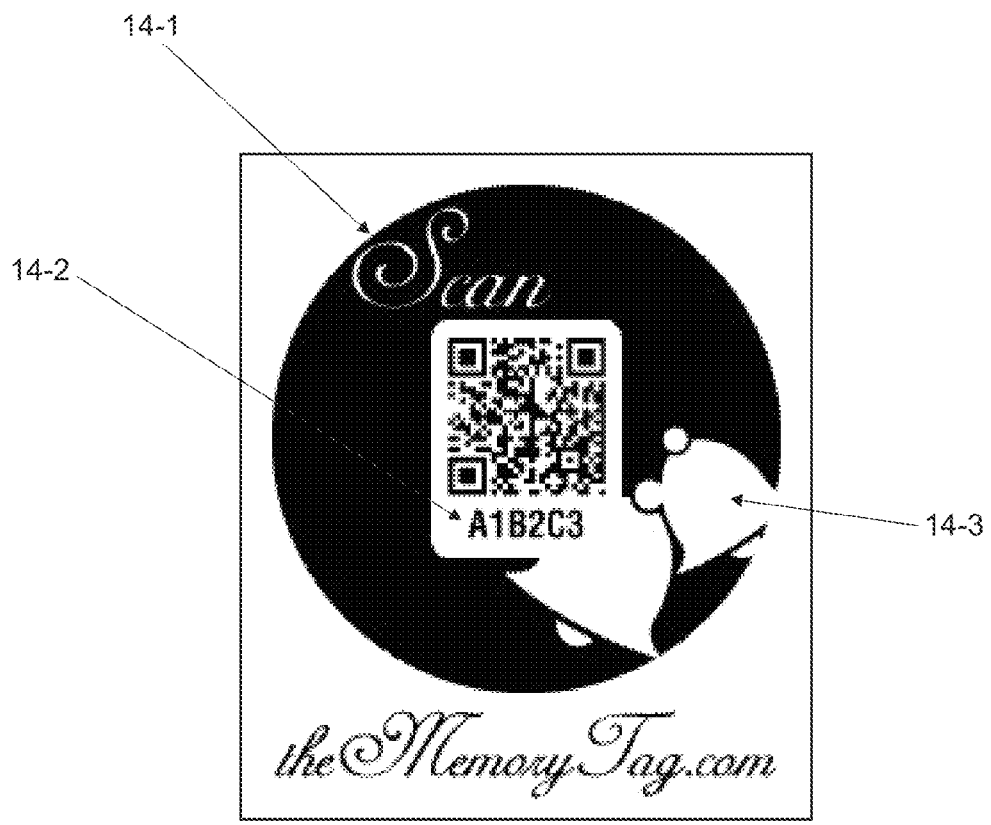
FIG. 14 is an illustrative example of a momento using this present invention involving the use of a hybrid multi dimensional bar text code.

In another embodiment of this present invention FIG. 14 is an illustrative example of a momento, where an area for descriptive text is available (14-1), some icon or symbol for the celebration is imprinted or otherwise visible (14-3), and is shown using this present invention involving the use of a hybrid multi dimensional bar text code (14-2).

Figure 15:
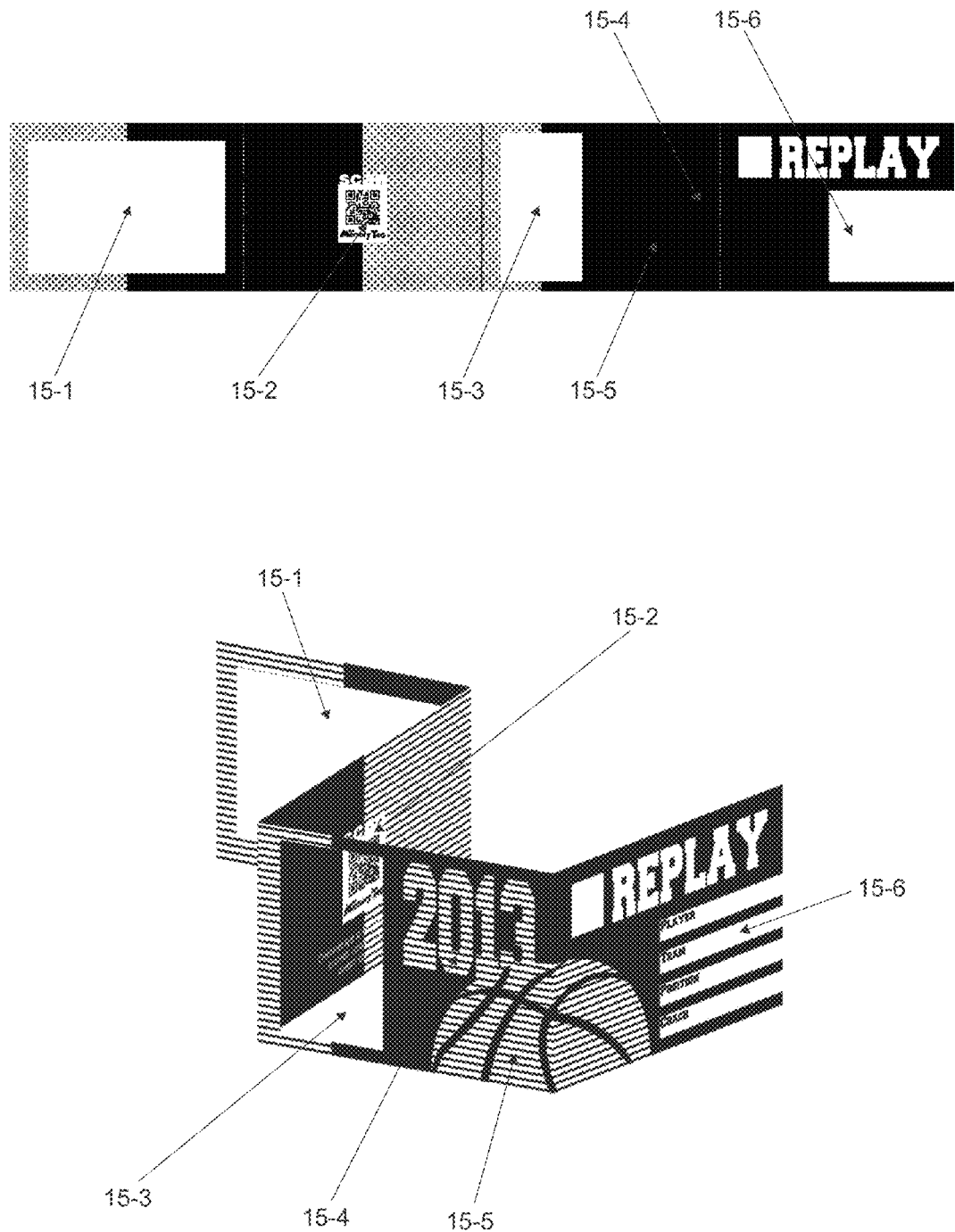
FIG. 15 is an illustrative example of momento that can be used to hold or showcase pictures or player stats related to events, in particular and non-limiting example with youth sporting teams, where information regarding the player, team, position, coach, year, using this present invention involving the use of a hybrid multi dimensional bar text code.
Figure 16:
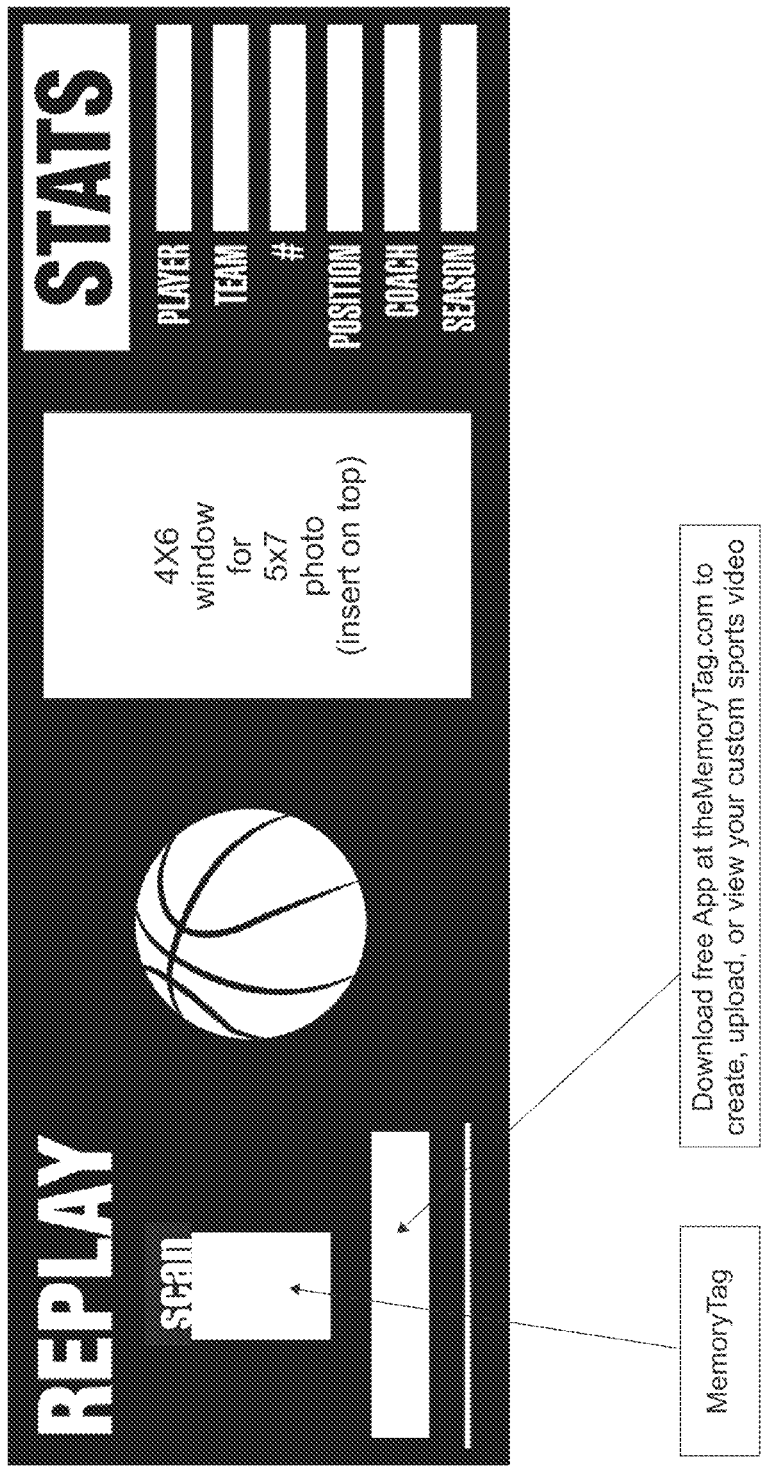
FIGS. 16-19 are illustrative examples of momentos that can be used to showcase an event, such as, but not limited to a sports game or a wedding, for example using this present invention involving the use of a hybrid multi dimensional bar text code.
Figure 17:
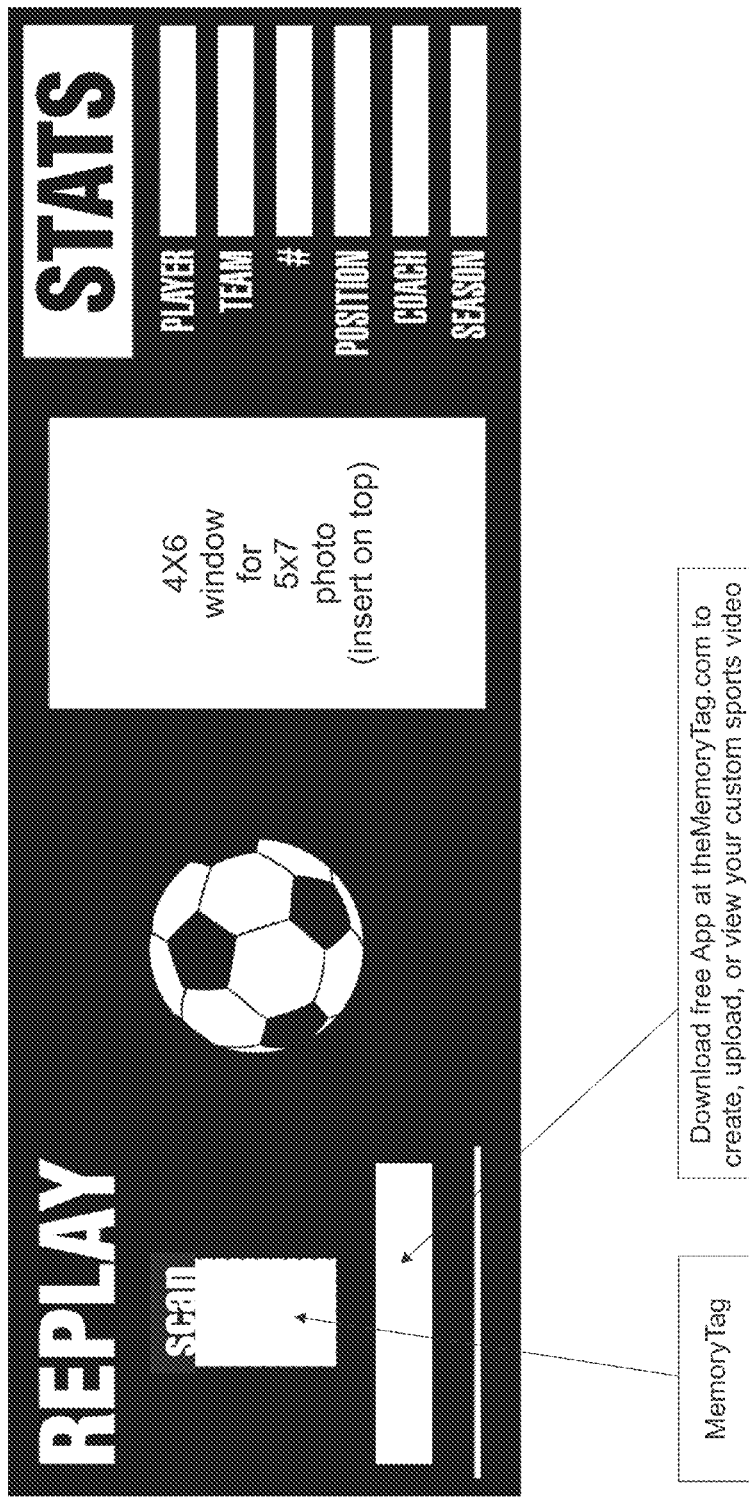
Figure 18:
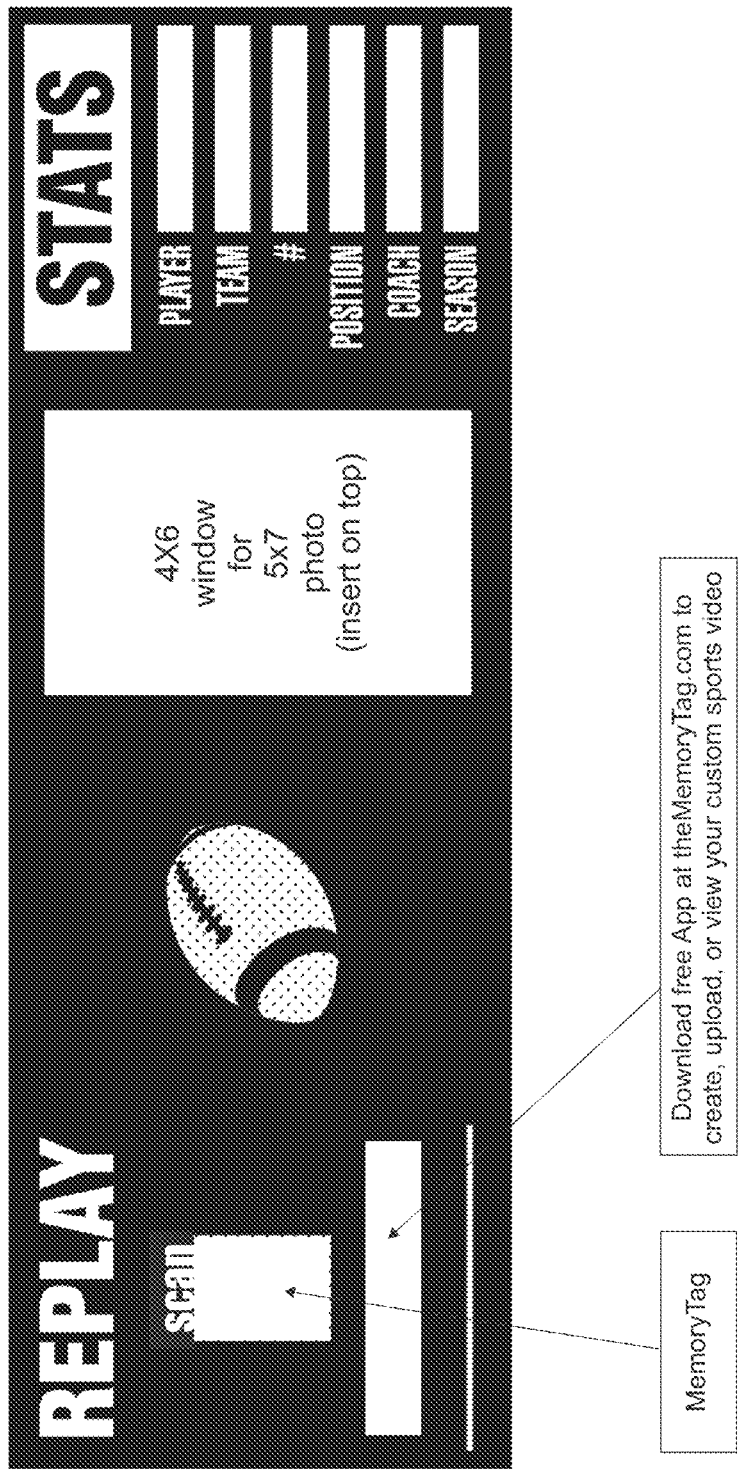
Figure 19:
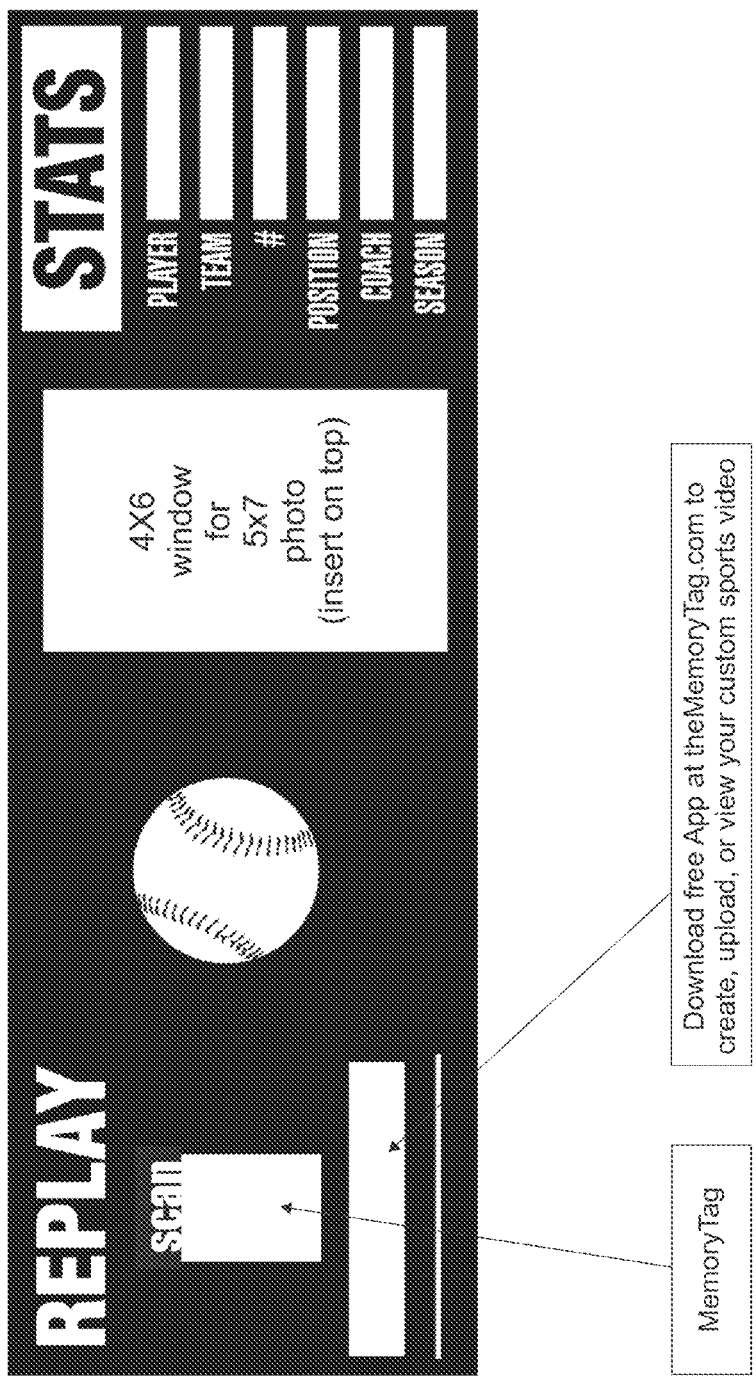
Figure 20:
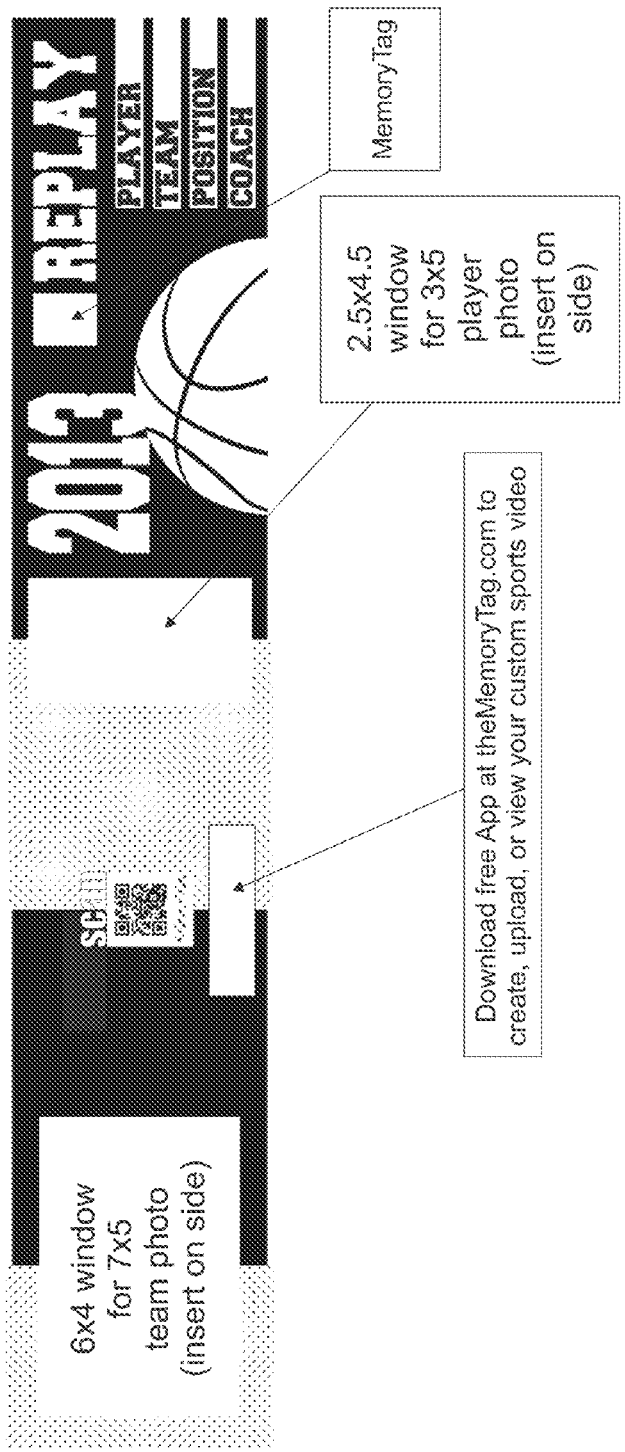
FIGS. 20-23 are illustrative examples of momentos that can be used to showcase an event, such as, but not limited to, a sports game or a wedding, for example using this present invention involving the use of a hybrid multi dimensional bar text code.
Figure 21:
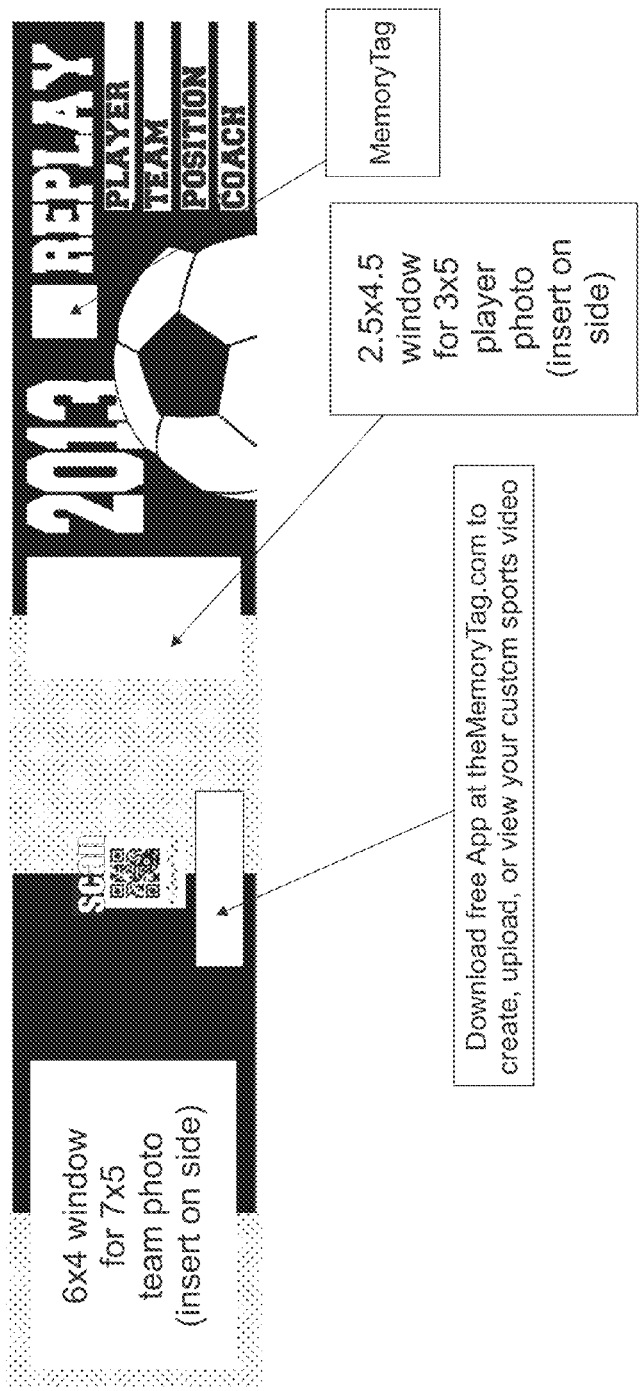
Figure 22:
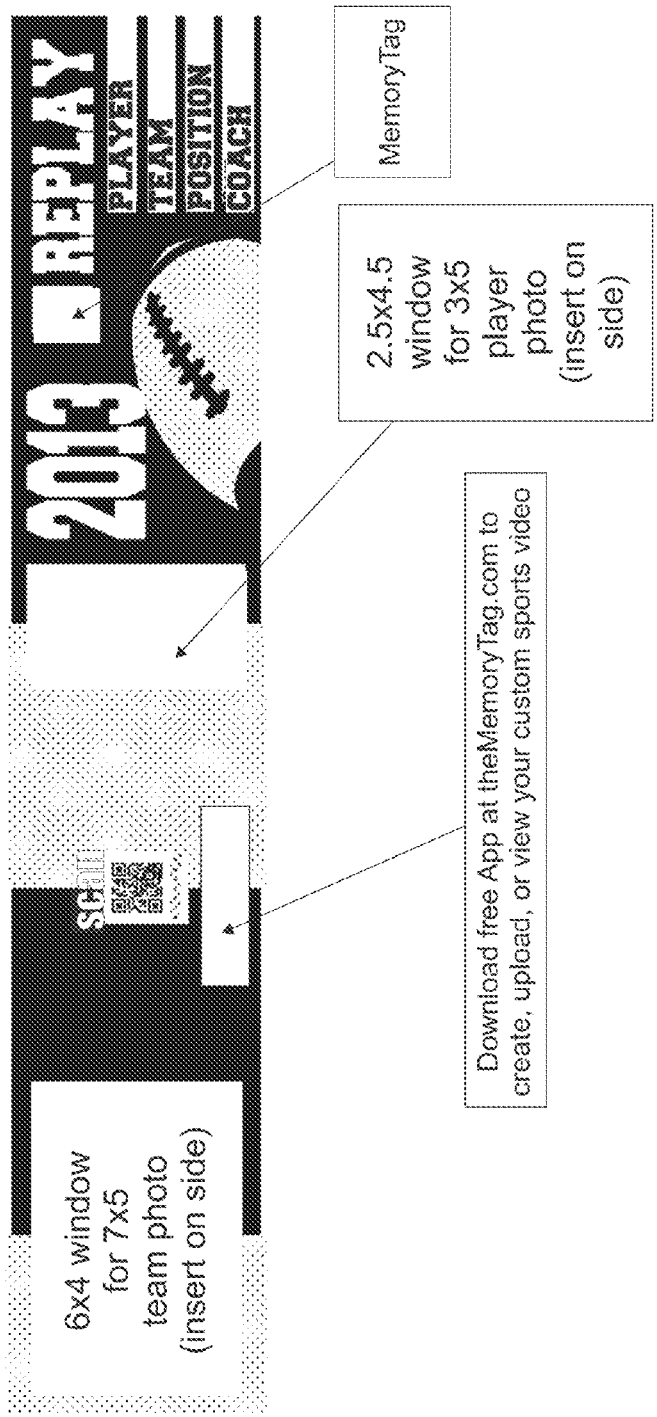
Figure 23:
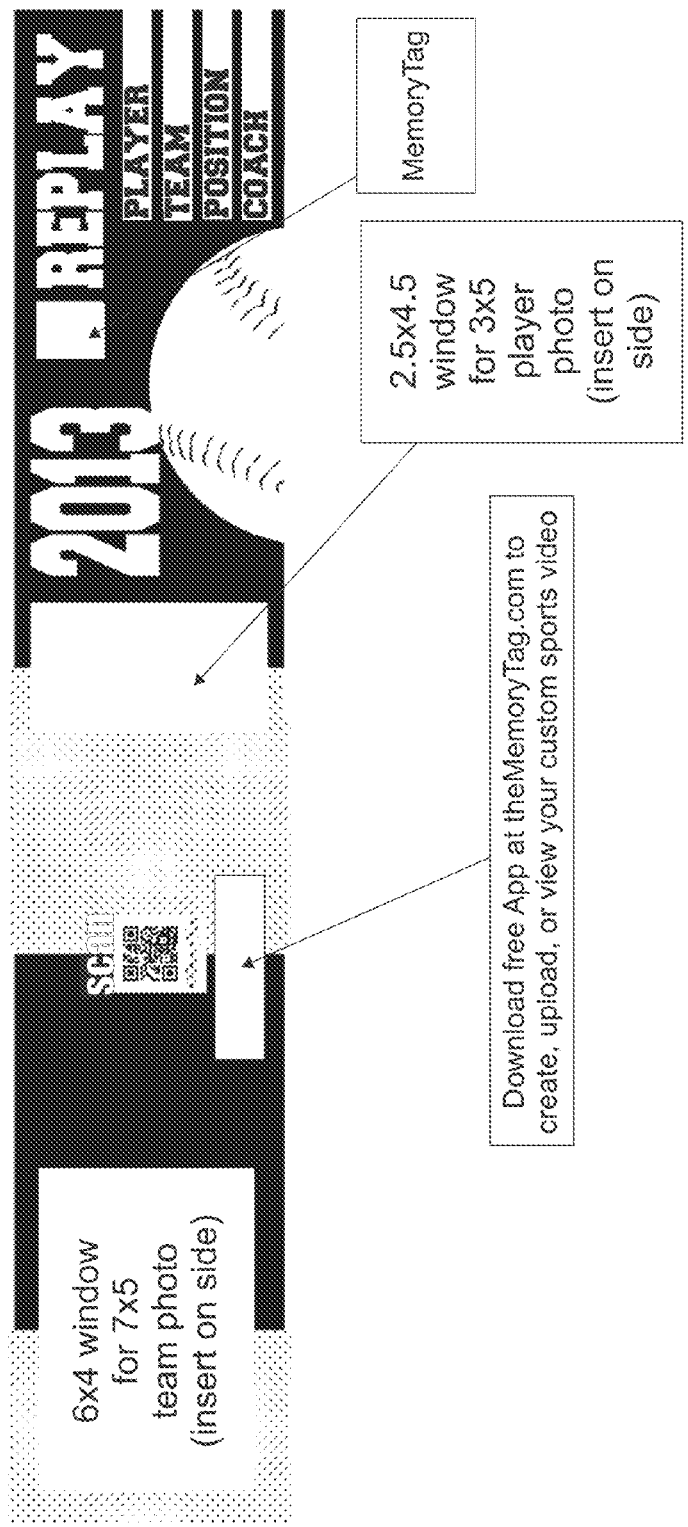
Figure 24:
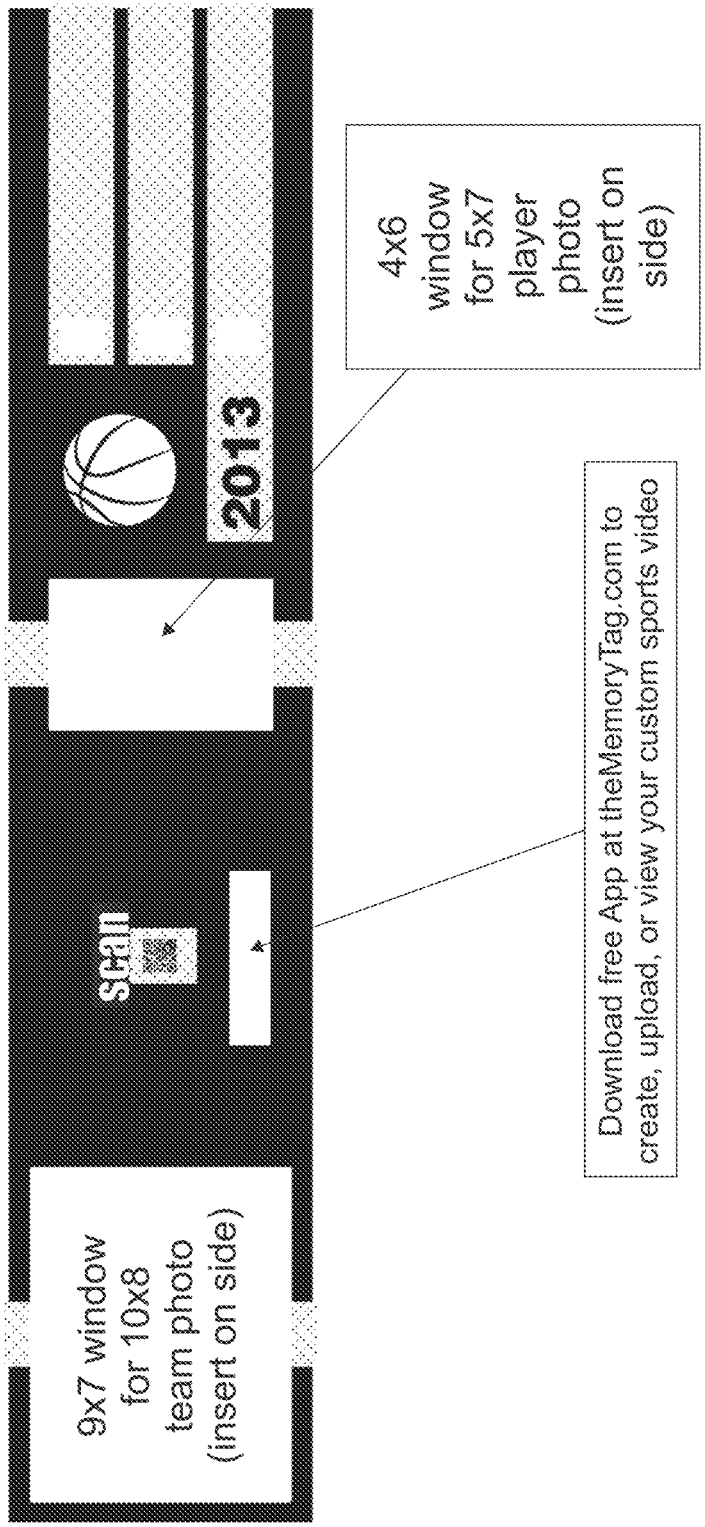
FIGS. 24-27 are illustrative examples of momentos that can be used to showcase an event, such as, but not limited to, a sports season or a wedding, for example where there are spaces for at least one picture and using this present invention involving the use of a hybrid multi dimensional bar text code.
Figure 25:
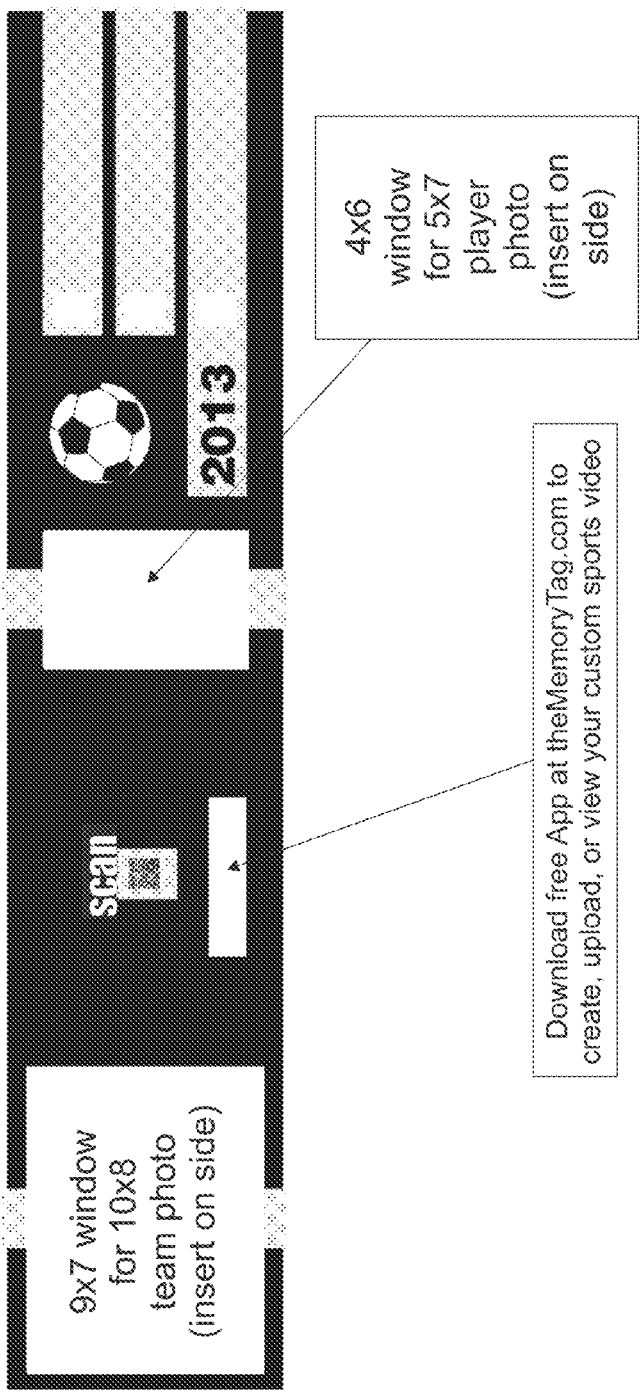
Figure 26:
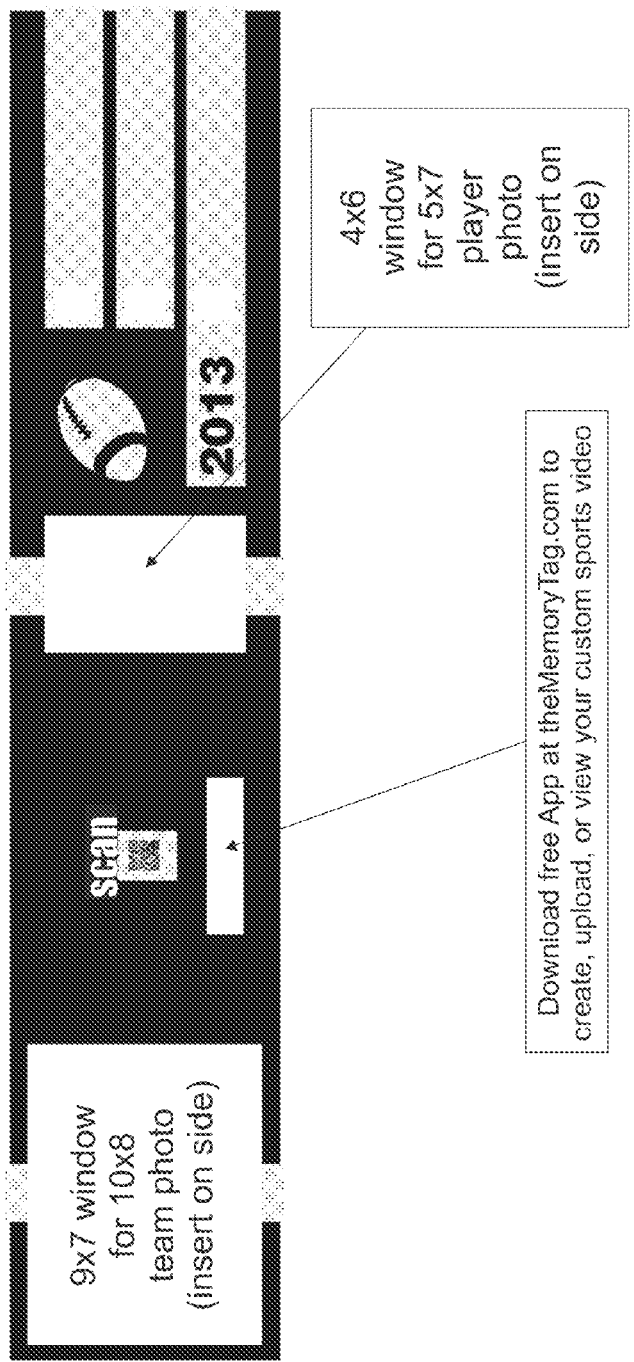
Figure 27:
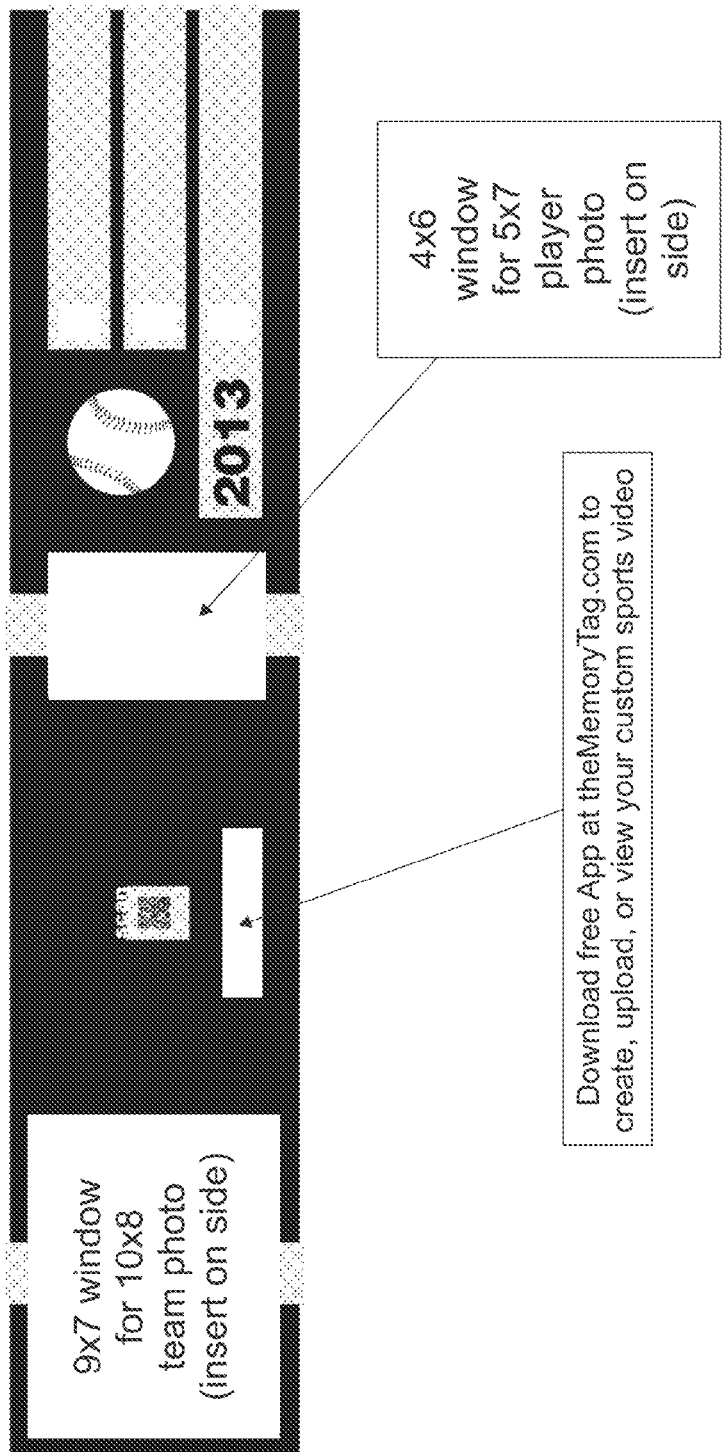

In another embodiment of this present invention, FIG. 15 is an illustrative example of momento that can be used to hold or showcase pictures or player stats (15-1, 15-3) related to events, in particular and non limiting example with youth sporting teams, where information regarding the player, team, position, coach, year (15-6), can be imprinted or otherwise made visible onto the momento (15-1 through 15-6), further using this present invention involving the use of a hybrid multi dimensional bar text code with corresponding area 13-2. Logos of each respective sport may be placed at 15-5 and season year at 15-4.

FIGS. 16-27 are illustrative examples of non-limiting embodiments of the present invention that include various game, player, or bed type activities. Drawings are shown in black and white, but all colors can be used with the momento in conjunction with the present invention, with the hybrid multi dimensional bar text code associated with various file types as previously discussed, and can be protected by some means, for example, with a password. Although sizes for typical pictures and portraits are shown in the figures, these sizes are not meant to be limiting examples of the present invention.

FIGS. 16-19 are illustrative examples of momentos that can be used to showcase an event, such as but not limited to a sports game or a wedding, for example using this present invention involving the use of a hybrid multi dimensional bar text code. Some non-limiting examples of sport momentos may include baseball, basketball, football, soccer, bowling, archery, fishing and other sports. Some non-limiting examples of event mementos may include weddings, anniversaries, romantic holidays such as Valentine's Day, any holiday occurring on any day of the year such as bosses day, administrative professionals' day, and nurses day, for example.

FIGS. 20-23 are illustrative examples of momentos that can be used to showcase an event, such as, but not limited to, a sports game or a wedding, for example using this present invention involving the use of a hybrid multi dimensional bar text code. Some non-limiting examples of sport momentos may include baseball, basketball, football, soccer, bowling, archery, fishing and other sports. Some non-limiting examples of event mementos may include weddings, anniversaries, romantic holidays such as Valentine's Day, any holiday occurring on any day of the year such as bosses day, administrative assistants day, and nurses day, for example.

FIGS. 24-27 are illustrative examples of momentos that can be used to showcase an event, such as, but not limited to, a sports season or a wedding, for example where there are spaces for at least one picture and using this present invention involving the use of a hybrid multi dimensional bar text code. Some non-limiting examples of sport momentos may include baseball, basketball, football, soccer, bowling, archery, fishing and other sports. Some non-limiting examples of event mementos may include weddings, anniversaries, romantic holidays such as Valentine's Day, religious holidays such as Christmas or Hanukkah, for example, and other holidays may also include Boss's day, administrative assistants day, and Nurses day/week, for example.

Figure 28:
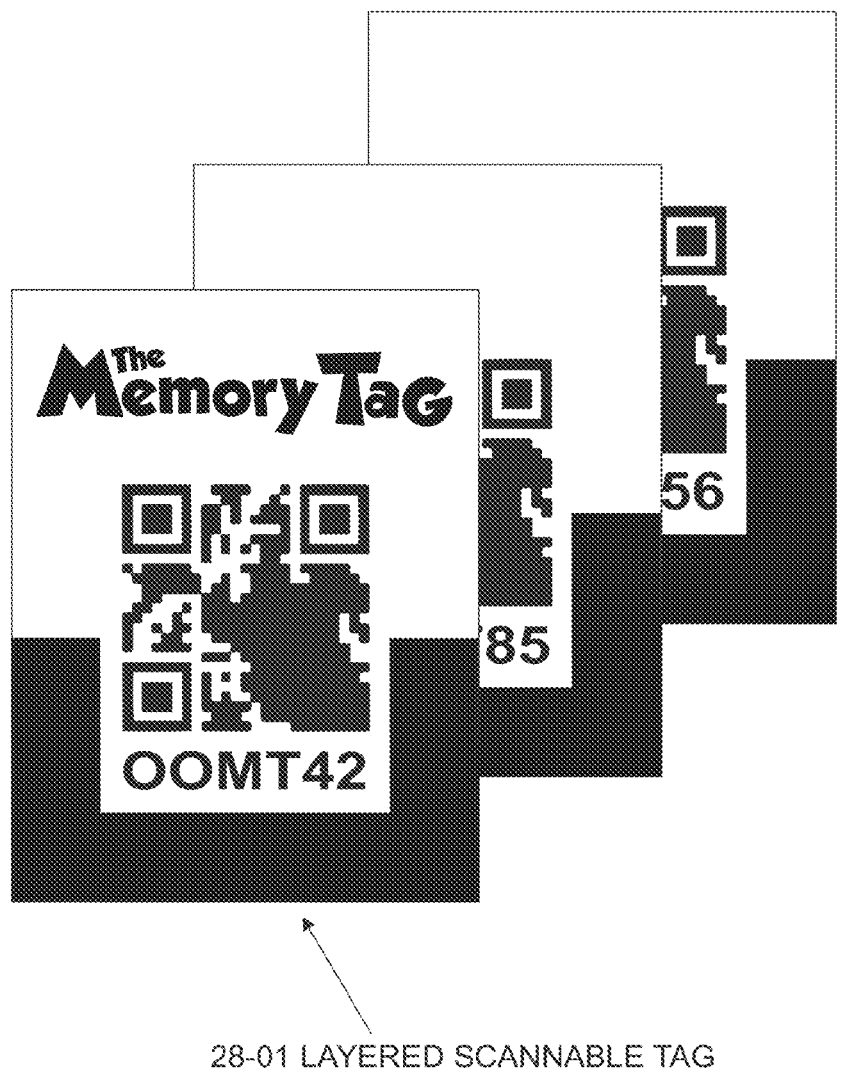
FIG. 28 is an illustrative example that depicts one embodiment of the present invention involving the use of hybrid multi-dimensional bar text code of multiple scannable layers in an exploded view.

The layered scannable tag 28-01 shown in FIG. 28, is illustrated showing an exploded type view illustrative example that depicts one embodiment of the present invention involving the use of hybrid multi-dimensional bar text code of multiple scannable layers. These separate scannable layers allow for a user to interact with another user through the same physical layered scannable tag 28-01 (explained in more detail in FIG. 31, below).

Figure 29:
FIG. 29. is an illustrative example that depicts one embodiment of the present invention involving the use of layered QR codes.

Another non-limiting embodiment of the present invention is shown in FIG. 29. This is an illustrative example that depicts one embodiment of the present invention involving the use of layered QR codes, but other codes or data matricies can be utilized as well, which can come in any shapes and sizes such as shapes of people's faces, any animal or body part thereof, any flowers, or plants, or any living or non-living thing: shapes, faces, flowers, plants, animals, cars, tires, and other everyday objects, aesthetic or not.

Figure 30:
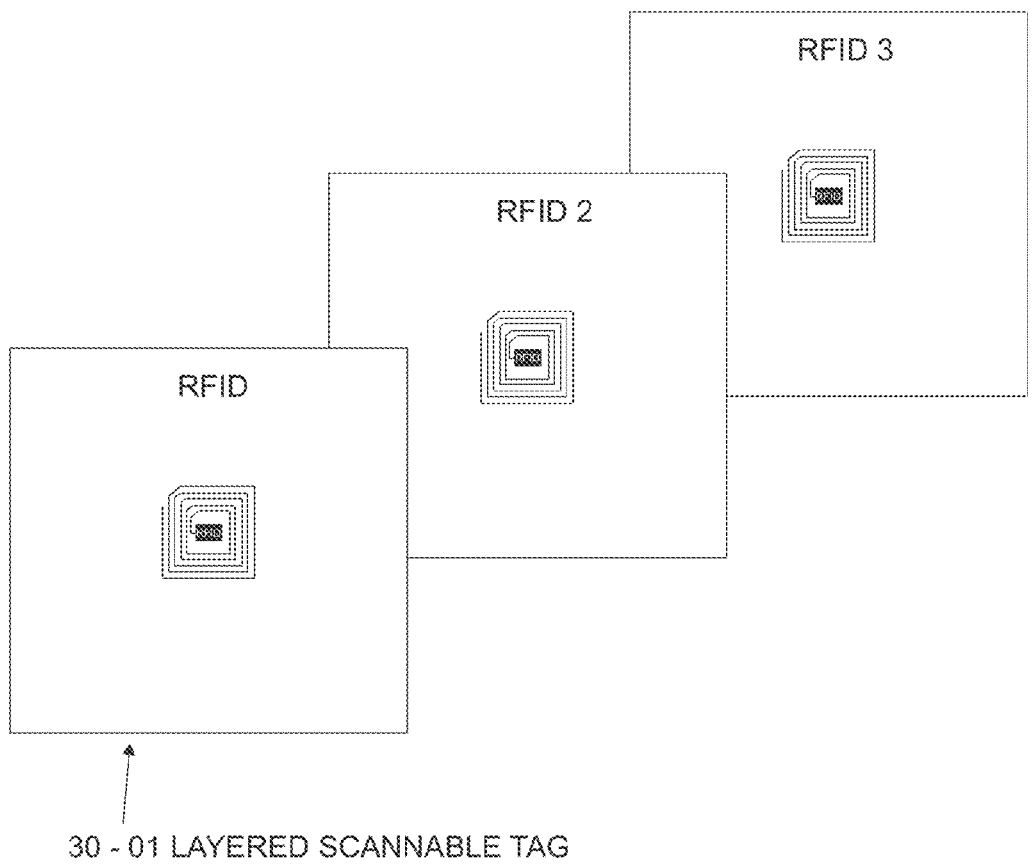
FIG. 30. Is an illustrative example that depicts one embodiment of the present invention showing the use of layered RFID tags (implanted).

FIG. 30 is an illustrative example that depicts one embodiment of the present invention showing the use of layered RFID tags to allow a user to interact with another user using multiple layered scannable tags, such as specialized RFID tags.

Figure 31:
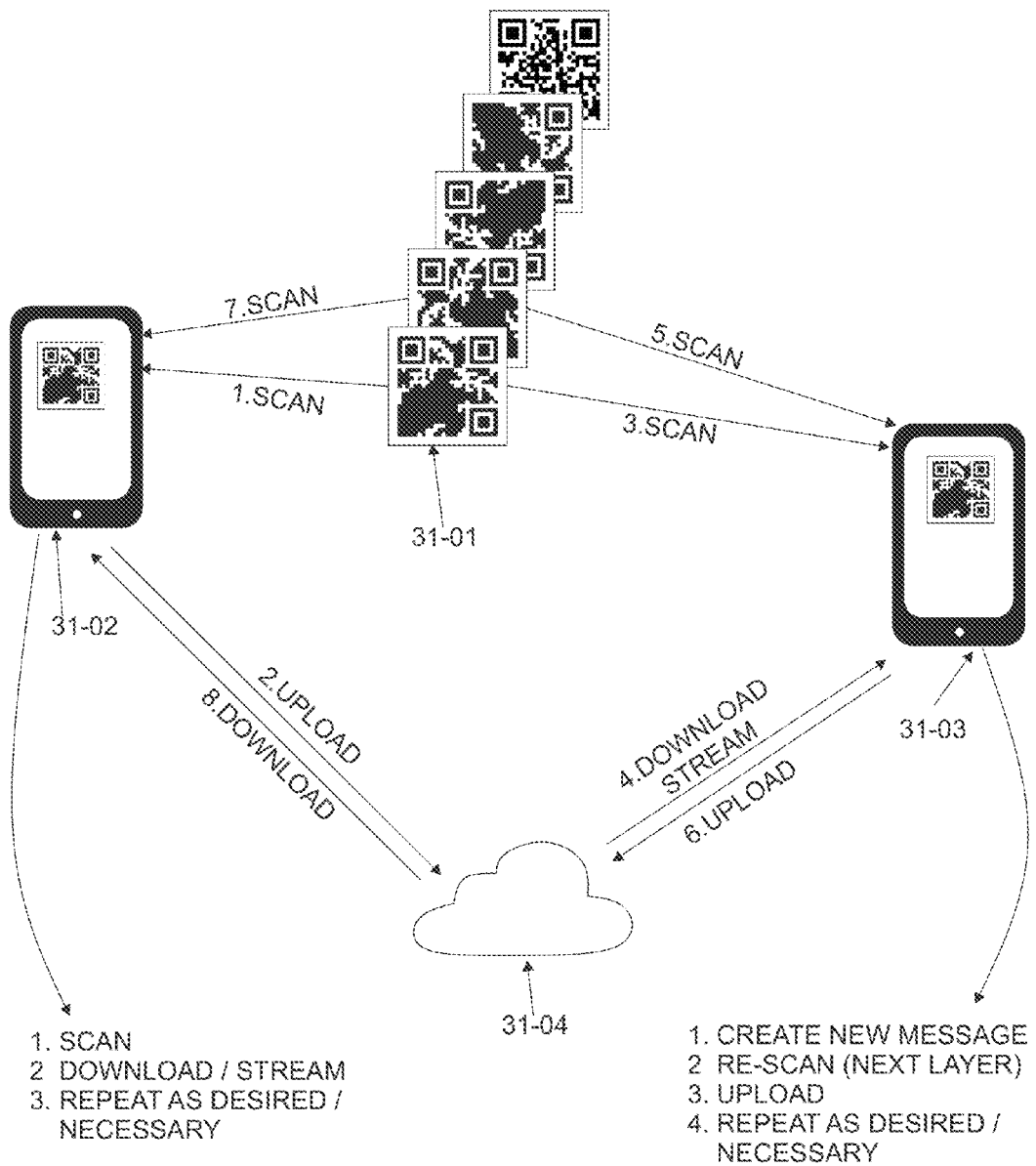
FIG. 31. is a (flow) chart illustrating one of the many embodiments of the present invention, where a user can scan a tag, upload a file to the cloud, associated with the tag, where a second user may scan the tag and watch the video, and repeat the process when sending a response using another layer within the scannable tag.

The flow chart in FIG. 31 illustrates one of the many embodiments of the present invention of the multilayer scannable tag 31-01, where a user can scan a tag using a device capable of such activity 31-02, upload a file to the cloud shown in arrow 2, associated with the tag, where a second user may scan the tag with their enabled device 31-03 and watch the video by downloading (arrow 4), and repeat the process when sending a response using another layer within the scannable tag by scanning another layer (arrow 5), and uploading to the cloud 31-04 the video or file to be associated with the second layer of the tag (arrow 6), wherein the first, or another, user may scan the second layer of the multiple layered scannable tag (arrow 7), to get access to the second file uploaded by the second user by downloading (arrow 8) from the cloud 31-04. This process can be repeated infinite times depending on the users' preferences.

In another example of this present embodiment, the administrator of the application and application's server may have powers to manage user submitted data. The administrator of the application may decide to remove uploaded files if it is within their discretion. The administrator of the application of this present invention may also manage payment information.

The scannable tag may also provide a physical-to-virtual (P2V), and continued virtual, and back to physical realm, enabling users to interacting with others, including businesses or other organizations. There are examples of QR codes, that once scanned, may link the user directly to a website, usually consisting of the advertising something (such as a good), but there are not examples where scanning a scannable tag, equipped with data matrix, that allows the user to selectively upload or share their multimedia with others across the current popular social media sites, using an "App" used in conjunction (or as a stand alone) with the App's own specialized social media platform that provides the user with more options, functionality, allowing a more interactive and personal experience between persons, person to business, or business to business types of interaction.

This specialized social media platform, is not limited to sharing on its own site, but may also share on other sites or onto other social media platforms.

Once uploaded, the length of time these files stay on the server may be selected and maintained by the user, wherein the user can adjust or select the duration that the files are maintained or otherwise stay on the server. The shorter, or longer the file stands server, a fee may be required to maintain this request, but it is possible with the system. Most users may select the default option, which may be specified by the administrator of the server (could range from seconds, to minutes, to hours, to days, to weeks, or maybe even a month or more), but in the event that the user wants to choose something other than the default, a fee for this maintenance may be levied against the user's file that was uploaded.

The App provides an interactive page that allows or facilitates the scan of the scannable tag, to allow the user to upload various file types, including but not limited to, video, audio, pictures, or any other type of multimedia file, or any other file that the user wants to upload (providing that it is within the terms of service of the App), and selectively upload that to their own unique channel or unique user page, which may include a personal channel or a business channel, or a group channel, for example—where others may follow or watch the various channels, and even interact or post their own videos back to the original poster, linking to another layer of the scannable tag, for example.

Once uploaded, another user may scan this scannable tag, which may have more than one layer, or family of layers, that allows the user to visit various components associated with each layer within the specialized social media platform, for example for a business, for an employee of the business, or the employee page, or any personal social media platform page, previously set up by the user, wherein the scannable tag is linked from the physical scannable tag, to a virtual world, linking another user to this specialized social media platform so that they can continue to interact.

Besides personal uses, the scannable tag may also be used for business-to-business (B2B) purposes as well. For example, the multilayered scannable tag may provide an interactive experience with a manager, wherein the manager could scan the scannable tag and upload a message to her employees about recent changes in company policy, and once the employees have scanned the tag and watched, or viewed the message of the manager, the employees would be able to upload their response(s) to the message of the manager—to provide a personalized message or response to the group or individuals once scanned.

These multilevel, or multilayered scannable tags, will also allow for many other possibilities including, but not limited to, the opportunity for employees (workers, laborers, etc.) to interact with upper management to provide feedback on, for example, and not limited to, safety protocols where direct documentation can be obtained by scanning a multilevel tag and the user may uploads to the cloud, and becomes immediately accessible to upper-level safety management personnel, for example, so that they can quickly and adequately respond to any safety issue raised, and this would also provide an opportunity for the upper-level management to respond to this issue to let people know that of reported the issue that there report has been seen. The system would provide for adequate chain of custody and documenting employees concerns for any issue.

In another non-preferred embodiment, if a user goes to a store, such a shoe store, the user can scan a scannable tag on the shoe box or shoe of and this scanning event would link the user directly to the company's content, and social platform or respond in various way to give feedback directly, and potentially immediately, back through the tag to the user's profile or company's profile within the social media platform.

Additionally, a person-2-person sharing may also occur, where a user may place a scannable tag on their locker, another (person) with a device capable of scanning the tag, can respond directly to the first user, watch the first user's content or go to the first user's social media platform and view that user's profile, videos, content, based upon privilege information embedded into the layered scannable tag or within the application preferences.

These multilevel, or multilayered, scannable tags would have a data matrix that corresponds to a particular user, and their uploaded data, and the website by way of utilizing at least one layer of the scannable tags through the code system as defined by this specification. For example, the layers may correspond to at least one of the following, scan and watch; go to website; responding back (with read response receipts); responding with video response (video conversation, such as email), replies, where each layer can correspond with retrieving, sending, or interact to form other useful functions with the said layers.

Specific reference to components, process steps, and other elements are not intended to be limiting. Further, it is understood that like parts bear the same reference numerals, when referring to alternate Figures. It will be further noted that the Figures are schematic and provided for guidance to the skilled reader and are not necessarily drawn to scale. Rather, the various drawing scales, aspect ratios, and numbers of components shown in the Figures may be purposely distorted to make certain features or relationships easier to understand.

It is to be understood that the described embodiments of the invention are illustrative only and that modifications thereof may occur to those skilled in the art. Accordingly, this invention is not to be regarded as limited to the embodiments disclosed, but is to be limited only as defined by the appended claims herein.

REFERENCES

Incorporated Herein by Reference

Please find references below.

The invention claimed is:

1. A method for computer or mobile tagging comprising:
generating a multi-layer scannable tag, wherein generating said multi-layer scannable tag comprises generating a multi-layer scannable tag including a text component
receiving an indication that the multi-layer scannable tag has been scanned by a first user;
assigning a layer of the multi-layer scannable tag to the first user;
receiving an image, audio, video, or other file from the first user;
storing the image, audio, video, or other file in a location in cloud storage;
generating one unique URL link wherein that URL link is associated with the multi-layer scannable tag, the URL link also pointing to the location in cloud storage;
linking the multi-layer scannable tag with the location in cloud storage using the URL link;
tagging the image, audio, video, or other file with said multi-layer scannable tag;
wherein such tagging is accomplished by means of the use of a mobile application, computer program or similar electronic device
receiving an indication that the multi-layer scannable tag has been scanned by a second user;
assigning another layer of the multi-layer scannable tag to the second user;
receiving an image, audio, video, or other file from the second user;
storing the image, audio, video, or other file in a location in cloud storage;
generating one unique URL link wherein that URL link is associated with the multi-layer scannable tag, the URL link also pointing to the location in cloud storage; and
linking the multi-layer scannable tag with the location in cloud storage using the URL link.

2. A method of claim 1, wherein tagging said unique scannable tag layer with a submitted video, audio or other file tagged may be accomplished or tagged through a network or internet environment and through an application server and database.

3. A method of claim 1, wherein the multi-layer scannable tag comprises at least one unique layer, and the at least one unique layer is associated with video, audio or other file may be printed, stored, or otherwise implanted on printed media.

4. A method of claim 3, wherein the tagged video, audio or other file associated with the at least one unique layer of the multi-layer scannable tag is password protected or closed from view of others.

5. The method of claim 1, further comprising
uploading the video, audio or other file onto a cloud based file storage system; and
storing a unique alpha numeric code and URL link with the uploaded file; and
storing such submitted file and its associated multi-layer scannable tag until the user or systems administrator decides to delete or otherwise remove the submitted file.

6. A method claim 5, wherein the stored video, audio, or other file is also stored and associated with a unique URL link, multi-layer scannable tag, an alphanumeric or radio-frequency code.

7. A method of claim 5, wherein the stored video, audio, or other file may be password protected or otherwise secured for the benefit of the one who has submitted the file.

8. A method of claim 5, wherein the stored video, audio or other file is stored by the method of use of a mobile phone application, computer, website or similar electronic device.

9. A method of file and document retrieval comprising;
scanning a first layer of a multi-layer scannable tag by a camera or scanning device; or receiving an indication that the multi-layer scannable tag has been scanned by a first user;
assigning the first layer of the multi-layer scannable tag to the first user;
receiving an image, audio, video, or other file from the first user;
storing the image, audio, video, or other file in a location in cloud storage;
generating one unique URL link wherein that URL link is associated with the multi-layer scannable tag, the URL link also pointing to the location in cloud storage;
linking the multi-layer scannable tag with the location in cloud storage using the URL link;
tagging the image, audio, video, or other file with said multi-layer scannable tag;
wherein such tagging is accomplished by means of the use of a mobile application, computer program or similar electronic device;
retrieving video, audio or other files tagged and associated with said first layer of the multi-layer scannable tag;
playing the video, audio or other file tagged with said multi-layer scannable tag by embedded player;
scanning another layer of a multi-layer scannable tag by a camera or scanning device; or receiving an indication that the multi-layer scannable tag has been scanned by a second user;
assigning the another layer of the multi-layer scannable tag to the second user;
receiving an image, audio, video, or other file from the second user;
storing the image, audio, video, or other file in a location in cloud storage;
generating one unique URL link wherein that URL link is associated with the multi-layer scannable tag, the URL link also pointing to the location in cloud storage; and
linking the multi-layer scannable tag with the location in cloud storage using the URL link.

10. The document retrieval method of claim 9, wherein the multi-layer scannable tag contains an embedded URL link to which the tagged video, audio or other file is directly associated with.

11. The document retrieval method of claim 9, wherein a user has the choice of scanning the multi-layer scannable tag or inputting an alpha numeric code onto an application or website in order to retrieve the associated and tagged image, video, audio file or other file.

12. The document retrieval method of claim 9, wherein the multi-layer scannable tag is shared through various social media websites and available to view through the use of an embedded player.

13. The document retrieval method of claim 9, wherein an image, video, audio or other file is embedded into printed text to be retrieved by a user who wishes to supplement the data on the printed text with the embedded image, video, audio or other file.

14. The document retrieval method of claim 9, wherein the user shares video, audio, or other content by distributing multi-layer scannable tag or alphanumeric codes to others.

15. An apparatus for tagging, the apparatus comprising a memory storing instructions which, when processed by one or more processors, cause:
generating a multi-layer scannable tag that comprises a plurality of unique scannable layers;
receiving an indication that the multi-layer scannable tag has been scanned by a first user;
assigning a layer of the multi-layer scannable tag to the first user;
receiving an image, audio, video, or other file from the first user;
storing the image, audio, video, or other file in a location in cloud storage;
generating one unique URL link wherein that URL link is associated with the multi-layer scannable tag, the URL link also pointing to the location in cloud storage;
linking the multi-layer scannable tag with the location in cloud storage using the URL link;
tagging the image, audio, video, or other file with said multi-layer scannable tag;
wherein such tagging is accomplished by means of the use of a mobile application, computer program or similar electronic device;
receiving an indication that the multi-layer scannable tag has been scanned by a second user;
assigning another layer of the multi-layer scannable tag to the second user;
receiving an image, audio, video, or other file from the second user;
storing the image, audio, video, or other file in a location in cloud storage;
generating one unique URL link wherein that URL link is associated with the multi-layer scannable tag, the URL link also pointing to the location in cloud storage; and
linking the multi-layer scannable tag with the location in cloud storage using the URL link.

16. The apparatus of claim 15, the apparatus comprising a memory storing instructions which, when processed by one or more processors, cause: managing said uploaded and tagged files, in response to receiving instructions from the user, by at least one of providing password protection, viewing submitted files, uploading submitted files to social media websites, delete submitted files, add descriptions, add a title to, and print out or save associated scannable tags.

17. The apparatus of claim 15, the apparatus further comprising memory storing instructions which, when processed by one or more processors, cause: the functionality of automatically launching on a smart phone user's phone after the user captures an image of the scannable tag or radiofrequency associated therefrom.

18. The apparatus of claim 15, the apparatus further comprising memory storing instructions which, when processed by one or more processors, provide a component to allow new users to register for the application and a component that allows users to pay for use of the application by various methods including online credit card or by the use of third party merchants.

19. The apparatus of claim 15, the apparatus further comprising memory storing instructions which, when processed by one or more processors, cause generation of an interface wherein users may view through said interface their submitted video, photos or other files and the scannable tag and alpha numeric text code tagged and associated with each image.

20. The apparatus of claim 15, the apparatus further comprising memory storing instructions which, when processed by one or more processors, cause generation of an interface wherein an administrator of the application manages through said interface at least one of submitted images, associated scannable tags, and billing information.

21. A method, comprising:
generating a multi-layer scannable tag that comprises a plurality of unique scannable layers;
receiving an indication that the multi-layer scannable tag has been scanned by a first user;
assigning a layer of the multi-layer scannable tag to the first user;
receiving an image, audio, video, or other file from the first user;
storing the image, audio, video, or other file in a location in cloud storage;
generating one unique URL link wherein that URL link is associated with the multi-layer scannable tag, the URL link also pointing to the location in cloud storage;
linking the multi-layer scannable tag with the location in cloud storage using the URL link;
tagging the image, audio, video, or other file with said multi-layer scannable tag;
wherein such tagging is accomplished by means of the use of a mobile application, computer program or similar electronic device;
receiving an indication that the multi-layer scannable tag has been scanned by a second user;
assigning another layer of the multi-layer scannable tag to the second user;
receiving an image, audio, video, or other file from the second user;
storing the image, audio, video, or other file in a location in cloud storage;
generating one unique URL link wherein that URL link is associated with the multi-layer scannable tag, the URL link also pointing to the location in cloud storage; and
linking the multi-layer scannable tag with the location in cloud storage using the URL link.

22. The method according to claim 21, wherein image, audio, video, or other file from said first user is a message from said first user; and wherein image, audio, video, or other file from said second user is a message from said second user.

* * * * *